US012230847B2

(12) United States Patent
Ohnishi et al.

(10) Patent No.: US 12,230,847 B2
(45) Date of Patent: Feb. 18, 2025

(54) ELECTROCHEMICAL ELEMENT, ELECTROCHEMICAL MODULE, ELECTROCHEMICAL DEVICE, AND ENERGY SYSTEM

(71) Applicant: Osaka Gas Co., Ltd., Osaka (JP)

(72) Inventors: Hisao Ohnishi, Osaka (JP); Tetsuya Mori, Osaka (JP); Mitsuaki Echigo, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 621 days.

(21) Appl. No.: 17/599,346

(22) PCT Filed: Mar. 27, 2020

(86) PCT No.: PCT/JP2020/014327
§ 371 (c)(1),
(2) Date: Sep. 28, 2021

(87) PCT Pub. No.: WO2020/203892
PCT Pub. Date: Oct. 8, 2020

(65) Prior Publication Data
US 2022/0181648 A1     Jun. 9, 2022

(30) Foreign Application Priority Data

Mar. 29, 2019   (JP) .................................. 2019-069164

(51) Int. Cl.
| | |
|---|---|
| *H01M 8/0258* | (2016.01) |
| *C01B 3/34* | (2006.01) |
| *H01M 8/2483* | (2016.01) |
| *H01M 8/2484* | (2016.01) |

(52) U.S. Cl.
CPC ............. *H01M 8/0258* (2013.01); *C01B 3/34* (2013.01); *H01M 8/2483* (2016.02); *H01M 8/2484* (2016.02); *C01B 2203/0205* (2013.01); *C01B 2203/066* (2013.01); *C01B 2203/1241* (2013.01)

(58) Field of Classification Search
CPC ............. H01M 8/0258; H01M 8/2483; H01M 8/2484; H01M 8/0271; H01M 8/04007; H01M 8/04074; H01M 8/0606; H01M 8/2432; C01B 3/34; C01B 2203/0205; C01B 2203/066; C01B 2203/1241; C01B 2203/0233; C01B 2203/06; C01B 2203/0811; C01B 2203/127; C01B 2203/1288; C01B 3/384; C25B 1/23; C25B 3/00; C25B 3/26; C25B 9/75; C25B 9/77; C25B 1/04; C25B 9/70; C25B 15/08; Y02E 60/36; Y02E 60/50; Y02P 20/129

See application file for complete search history.

(56) References Cited

U.S. PATENT DOCUMENTS

| | | | |
|---|---|---|---|
| 5,476,375 A | 12/1995 | Khinkis et al. | |
| 5,554,454 A * | 9/1996 | Gardner | H01M 8/0245 |
| | | | 429/479 |
| 5,830,592 A | 11/1998 | Akagi | |
| 6,372,375 B1 | 4/2002 | Lawless | |
| 8,703,353 B2 | 4/2014 | Jeong | |
| 9,853,299 B2 | 12/2017 | Jeong | |
| 2004/0217011 A1 | 11/2004 | Strobel et al. | |
| 2005/0008911 A1 | 1/2005 | Kaye | |
| 2005/0061003 A1 * | 3/2005 | Miyauchi | H01M 8/04388 |
| | | | 60/801 |
| 2006/0093891 A1 | 5/2006 | Issacci et al. | |
| 2006/0137332 A1 * | 6/2006 | Allgeier | F02D 19/0644 |
| | | | 60/298 |
| 2007/0269703 A1 | 11/2007 | Kaye | |
| 2009/0226786 A1 | 9/2009 | Selcuk et al. | |
| 2010/0173208 A1 | 7/2010 | Hatada | |
| 2010/0192890 A1 * | 8/2010 | Brooks | F02C 7/143 |
| | | | 123/557 |
| 2011/0207018 A1 | 8/2011 | Nakagawa et al. | |
| 2011/0318665 A1 | 12/2011 | Yamamoto et al. | |

(Continued)

FOREIGN PATENT DOCUMENTS

| | | |
|---|---|---|
| EP | 342395 A1 | 1/2019 |
| JP | S6217959 A | 1/1987 |

(Continued)

OTHER PUBLICATIONS

Office Action issued in JP 2019-069164, Aug. 30, 2022, 10 pages.

(Continued)

*Primary Examiner* — Muhammad S Siddiquee
(74) *Attorney, Agent, or Firm* — The Webb Law Firm

(57) ABSTRACT

In the electrochemical element, a plate-like support includes an internal passage through which a first gas flows, a gas-permeable portion, and an electrochemical reaction portion in which a film-like electrode layer, a film-like electrolyte layer, and a film-like counter electrode layer are stacked so as to entirely or partially cover the gas-permeable portion. The internal passage includes a plurality of auxiliary passages through which the first gas flows in a predetermined flowing direction, and a distribution portion provided on the upstream side of the plurality of auxiliary passages in the flowing direction of the first gas. The plate-like support includes a supply structure that is located between the distribution portion and the auxiliary passages in the flowing direction. The first gas is temporarily stored in the distribution portion and supply of the first gas from the distribution portion to the plurality of auxiliary passages is limited.

21 Claims, 13 Drawing Sheets

(56) References Cited

U.S. PATENT DOCUMENTS

| | | | |
|---|---|---|---|
| 2014/0047814 A1* | 2/2014 | Steinwandel | H01M 8/04111 60/39.12 |
| 2015/0180079 A1 | 6/2015 | Leger et al. | |
| 2015/0311559 A1* | 10/2015 | Tsukamoto | H01M 8/2425 429/457 |
| 2016/0372778 A1 | 12/2016 | Hotta et al. | |
| 2016/0380298 A1 | 12/2016 | Leah et al. | |
| 2017/0110740 A1 | 4/2017 | Gurney et al. | |
| 2017/0309941 A1 | 10/2017 | Echigo et al. | |
| 2019/0229348 A1 | 7/2019 | Kim et al. | |
| 2020/0028193 A1 | 1/2020 | Echigo et al. | |
| 2021/0111415 A1 | 4/2021 | Ohnishi et al. | |

FOREIGN PATENT DOCUMENTS

| | | |
|---|---|---|
| JP | H3225767 A | 10/1991 |
| JP | H5174858 A | 7/1993 |
| JP | 982352 A | 3/1997 |
| JP | 2002518794 A | 6/2002 |
| JP | 2007227130 A | 9/2007 |
| JP | 2009117250 A | 5/2009 |
| JP | 2009277539 A | 11/2009 |
| JP | 2011216308 A | 10/2011 |
| JP | 2012129134 A | 7/2012 |
| JP | 5298758 B2 | 6/2013 |
| JP | 2015207509 A | 11/2015 |
| JP | 2016195029 A | 11/2016 |
| JP | 201741404 A | 2/2017 |
| JP | 2017508254 A | 3/2017 |
| JP | 2017183177 A | 10/2017 |
| JP | 2017183224 A | 10/2017 |
| JP | 2017188224 A | 10/2017 |
| JP | 2018174115 A | 11/2018 |
| JP | 2018200748 A | 12/2018 |
| KR | 1020100034746 A | 4/2010 |
| KR | 1020170057366 A | 5/2017 |
| KR | 1020180069953 A | 6/2018 |
| WO | 2011033745 A1 | 3/2011 |
| WO | 2018088701 A1 | 5/2018 |
| WO | 2018199095 A1 | 11/2018 |
| WO | 2019189915 A1 | 10/2019 |

OTHER PUBLICATIONS

Choudhury et al., Application of solid oxide fuel cell technology for power generation—A review, Renewable and Sustainable Energy Reviews, Jan. 10, 2013, pp. 430-442, vol. 20.

\* cited by examiner

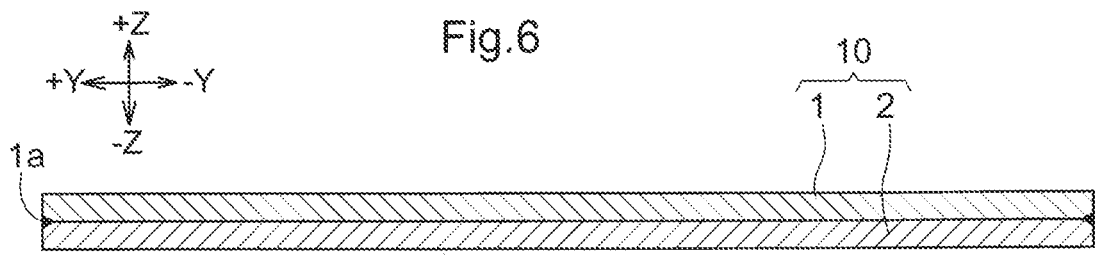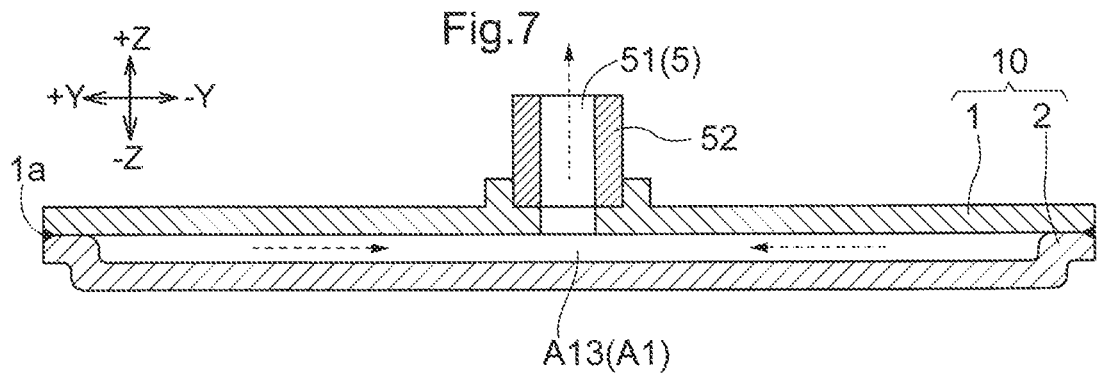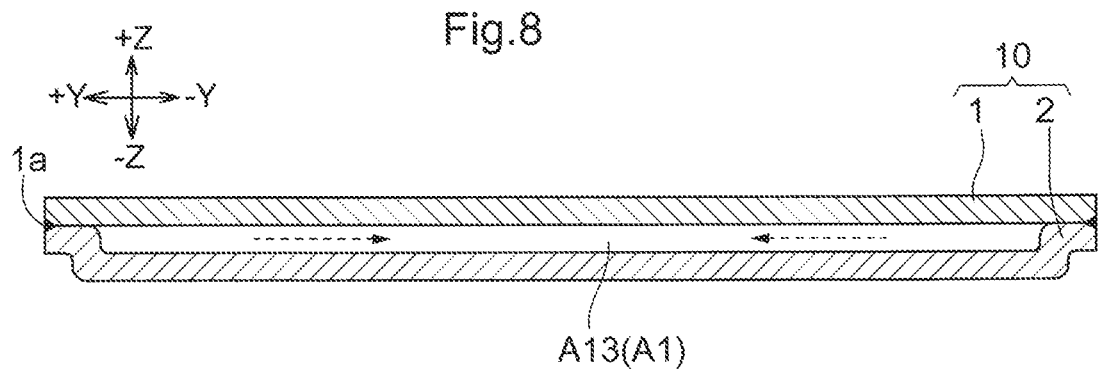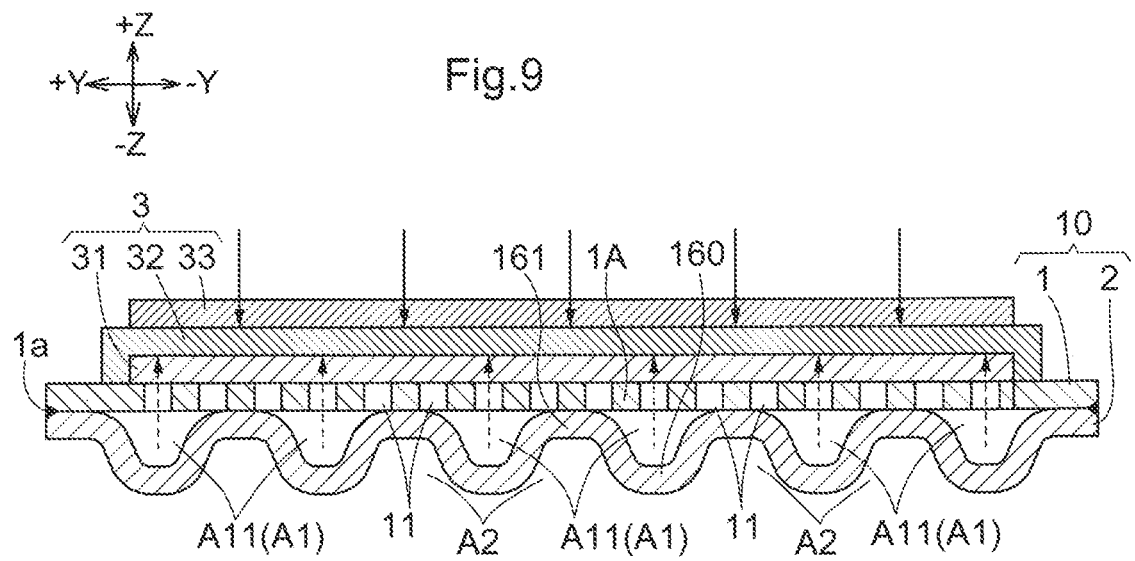

ELECTROCHEMICAL ELEMENT, ELECTROCHEMICAL MODULE, ELECTROCHEMICAL DEVICE, AND ENERGY SYSTEM

CROSS-REFERENCE TO RELATED APPLICATIONS

This application is the United States national phase of International Application No. PCT/JP2020/014327 filed Mar. 27, 2020, and claims priority to Japanese Patent Application No. 2019-069164 filed Mar. 29, 2019, the disclosures of which are hereby incorporated by reference in their entirety.

BACKGROUND OF THE INVENTION

1. Field of the Invention

The present invention relates to an electrochemical element, an electrochemical module, an electrochemical device, and an energy system.

2. Description of Related Art

Japanese Patent Application Publication No. JP 2017-188224A (Patent Document 1) discloses a fuel cell stack in which fuel cells and separators made of a porous material are alternately stacked. The fuel cells each include an electrolyte film, an oxidant electrode, and a fuel electrode. The oxidant electrode is formed on one face of the electrolyte film, and the fuel electrode is formed on the other face of the electrolyte film. An oxidant gas passage is formed so as to extend in a plane direction in a separator that faces the oxidant electrode, and oxidant gas flows through the oxidant gas passage. Similarly, a fuel gas passage is formed so as to extend in the plane direction in a separator that faces the fuel electrode, and fuel gas flows through the fuel gas passage. The stack formed as described above generates power through an electrochemical reaction between the fuel gas containing hydrogen and the oxidant gas containing oxygen.

SUMMARY OF THE INVENTION

In the fuel cells described in Patent Document 1, the electrolyte film, the oxidant electrode, and the fuel electrode are stacked one on top of another, and the oxidant gas and the fuel gas flow in the plane direction. However, consideration is not given for flow distribution of the fuel gas in auxiliary passages of the fuel cells described in Patent Document 1. For example, when flow of the fuel gas flowing in the auxiliary passages is viewed at one position in the flowing direction, the flow rate of the fuel gas flowing in the auxiliary passages may not be constant in an intersection direction intersecting that position. That is, in the intersection direction at that position, the flow rate of the fuel gas flowing in an auxiliary passage is faster than the flow rate of the fuel gas flowing in another auxiliary passage. Accordingly, even when the fuel gas is sufficiently supplied to the electrode layer at a position at which the flow rate of the fuel gas is low, the fuel gas may not be sufficiently supplied to the electrode layer at a position at which the flow rate of the fuel gas is high. Consequently, an electrochemical reaction does not sufficiently occur in the fuel cell, and the power generation efficiency decreases.

The present invention was made in view of the above-described problem, and has an object of providing a technology that can improve the power generation efficiency.

A characteristic configuration of an electrochemical element according to the present invention includes:
a conductive plate-like support provided with an internal passage therein, the internal passage being configured such that first gas that is one of reducing component gas and oxidative component gas flows through the internal passage,
wherein the plate-like support includes:
a gas-permeable portion through which gas is permeable between the internal passage, which is located inside the plate-like support, and the outside; and
an electrochemical reaction portion that is formed by stacking at least a film-like electrode layer, a film-like electrolyte layer, and a film-like counter electrode layer in the stated order in a predetermined stacking direction so as to entirely or partially cover the gas-permeable portion,
the internal passage includes a plurality of auxiliary passages through which the first gas flows in a predetermined flowing direction, and a distribution portion that is provided on an upstream side of the plurality of auxiliary passages in the flowing direction of the first gas, and
the plate-like support includes a supply structure that is located between the distribution portion and the plurality of auxiliary passages in the flowing direction and with which the first gas is temporarily stored in the distribution portion and supply of the first gas from the distribution portion to the plurality of auxiliary passages is limited.

With the above-mentioned characteristic configuration, the plate-like support is provided with the internal passage through which the first gas flows therein. The internal passage includes the distribution portion and the plurality of auxiliary passages, and the distribution portion is located on the upstream side with respect to the auxiliary passages in the direction in which the first gas flows. The plate-like support is provided with the supply structure between the distribution portion and the plurality of auxiliary passages in the flowing direction. Due to the supply structure, the first gas is temporarily stored in the distribution portion and distributed from the distribution portion to the plurality of auxiliary passages. Providing such a supply structure makes it possible to substantially uniformly supply the first gas from the distribution portion to the auxiliary passages. Accordingly, the reaction efficiency of the electrochemical element can be improved.

The following is a more specific description. The supply structure having the above-mentioned configuration is provided between the distribution portion and the plurality of auxiliary passages, and serves as a barrier for the flow of the first gas from the distribution portion to the plurality of auxiliary passages. Accordingly, pressure loss of the first gas increases when the first gas flows from the distribution portion to the plurality of auxiliary passages, and the first gas introduced into the distribution portion is distributed over the distribution portion so as to fill the distribution portion and is thus temporarily stored therein. Accordingly, the overall pressure in the distribution portion is substantially uniform (equal pressure). That is, differences in pressure between the distribution portion and the plurality of auxiliary passages are substantially the same. Then, the first gas is supplied from the distribution portion to the plurality of auxiliary passages, and therefore, the first gas is supplied to the auxiliary passages with substantially equal pressure. Accordingly, the flow distribution (including the flow rate, the flow amount, the pressure, and the like) of the first gas in the flow direction is substantially uniform among the auxiliary passages.

Moreover, flow of the first gas from the distribution portion is divided and introduced into the plurality of auxiliary passages. The flow distribution (including the flow rate, the flow amount, the pressure, and the like) of the first gas is also made substantially equal by a flow straightening effect due to the first gas flowing separately in the plurality of passages, compared with the case where the first gas flows in an internal passage that is not provided with a plurality of passages.

In another characteristic configuration of the electrochemical element according to the present invention, the supply structure includes a supply passing portion through which the first gas flows from the distribution portion to the plurality of auxiliary passages, and a supply preventing portion that prevents the first gas from flowing from the distribution portion to the plurality of auxiliary passages.

In the supply structure having the above-mentioned configuration, the supply preventing portion serves as a barrier for flow of the first gas from the distribution portion to the plurality of auxiliary passages and prevents the first gas from flowing from the distribution portion to the plurality of auxiliary passages. On the other hand, the supply passing portion introduces the first gas from the distribution portion into the plurality of auxiliary passages. Accordingly, the first gas introduced into the distribution portion does not immediately flow into the plurality of auxiliary passages, the pressure loss increases due to the supply preventing portion serving as the barrier, and the first gas is distributed over the distribution portion so as to fill the distribution portion, and is temporarily stored therein. Then, the first gas is supplied from the distribution portion through the supply passing portion to the plurality of auxiliary passages. Accordingly, the first gas is supplied from the distribution portion to the auxiliary passages with substantially equal pressure, and the flow distribution (including the flow rate, the flow amount, the pressure, and the like) of the first gas in the flow direction is substantially uniform among the auxiliary passages.

In another characteristic configuration of the electrochemical element according to the present invention,
the plate-like support includes a plurality of auxiliary passage forming portions that form the plurality of auxiliary passages, and a plurality of partitioning portions that are each provided between adjacent auxiliary passage forming portions to separate adjacent auxiliary passages, and
the plurality of partitioning portions are arranged such that any of the partitioning portions corresponds to the supply passing portion in the flowing direction.

The first gas is introduced from the distribution portion through the supply passing portion to the plurality of auxiliary passages. With the above-mentioned configuration, any of the partitioning portions corresponds to the supply passing portion in the flowing direction, and therefore, the first gas ejected from the distribution portion into the supply passing portion flows in the flowing direction and thus collides against the partitioning portion. Due to the collision with the partitioning portion, the first gas flows in the intersection direction intersecting the flowing direction. That is, the first gas flowing from the distribution portion through the supply passing portion is not immediately introduced into the plurality of auxiliary passages, but collides against the partitioning portion on the upstream side of the auxiliary passages and flows in the intersection direction. Thereafter, the first gas flows along the ejection from the distribution portion and is introduced into the plurality of auxiliary passages formed by the plurality of auxiliary passage forming portions. As a result of the first gas ejected from the supply passing portion being temporarily stored between the supply structure and the plurality of auxiliary passages as described above, the flow distribution (including the flow rate, the flow amount, the pressure, and the like) of the first gas in the flow direction can be made substantially uniform among the auxiliary passages.

In another characteristic configuration of the electrochemical element according to the present invention, the plurality of auxiliary passages formed by the plurality of auxiliary passage forming portions are arranged such that at least one of the auxiliary passages corresponds to the supply preventing portion in the flowing direction.

The first gas ejected from the distribution portion into the supply passing portion flows in the flowing direction and collides against the partitioning portion. Due to the collision with the partitioning portion, the first gas flows in the intersection direction intersecting the flowing direction, does not return to the distribution portion due to the supply preventing portion, and is temporarily stored between the supply structure and the plurality of auxiliary passages, and then introduced into the auxiliary passages. Accordingly, the flow distribution (including the flow rate, the flow amount, the pressure, and the like) of the first gas in the flowing direction can be made substantially uniform among the auxiliary passages.

In another characteristic configuration of the electrochemical element according to the present invention, the location of the supply preventing portion in the stacking direction differs from locations of the distribution portion and the supply passing portion in the stacking direction.

For example, in the plate-like support, the supply preventing portion is formed so as to protrude upward in the stacking direction with respect to the distribution portion and the supply passing portion. On the other hand, the distribution portion and the supply passing portion are formed so as to be recessed downward in the stacking direction with respect to the supply preventing portion. Accordingly, the first gas introduced into the distribution portion is prevented from being discharged from the distribution portion, by the supply preventing portion protruding upward in the stacking direction, and is temporarily stored in the distribution portion that is formed as a recessed portion. Thereafter, the first gas in the distribution portion is introduced into the plurality of auxiliary passages through the supply passing portion that is formed as a recessed portion.

In another characteristic configuration of the electrochemical element according to the present invention, locations of the partitioning portions in the stacking direction differ from locations of the auxiliary passage forming portions in the stacking direction.

For example, in the plate-like support, the partitioning portions are formed so as to protrude upward in the stacking direction with respect to the auxiliary passage forming portions. Accordingly, the first gas ejected from the distribution portion into the supply passing portion flows in the flowing direction and collides against the partitioning portions protruding upward in the stacking direction. Due to the collision with the partitioning portions, the first gas flows in the intersection direction, does not return to the distribution portion due to the supply preventing portion protruding upward in the stacking direction, and is temporarily stored between the supply structure and the plurality of auxiliary passages, and then introduced into the auxiliary passages. Accordingly, the flow distribution (including the flow rate, the flow amount, the pressure, and the like) of the first gas in the flowing direction can be made substantially uniform among the auxiliary passages.

In another characteristic configuration of the electrochemical element according to the present invention,
the internal passage includes a confluence portion that is provided on a downstream side of the plurality of auxiliary passages in the flowing direction of the first gas, and
the plate-like support includes a discharge structure that is located between the plurality of auxiliary passages and the confluence portion in the flowing direction and with which discharge of the first gas from the plurality of auxiliary passages to the confluence portion is limited.

With the above-mentioned configuration, the supply structure for supplying the first gas from the distribution portion to the plurality of auxiliary passages with substantially uniform flow distribution is provided, and in addition, the discharge structure is provided at a position where the first gas enters the confluence portion from the plurality of auxiliary passages. The plurality of auxiliary passages are located between the supply structure and the discharge structure, thus making it possible to make the flow distribution (including the flow rate, the flow amount, the pressure, and the like) of the first gas substantially uniform among the plurality of auxiliary passages and to improve the reaction efficiency of an electrochemical reaction.

The following is a more specific description. The discharge structure having the above-mentioned configuration is provided between the plurality of auxiliary passages and the confluence portion and serves as a barrier for flow of the first gas from the auxiliary passages to the confluence portion. Accordingly, pressure loss of the first gas increases when the first gas flows from the plurality of auxiliary passages into the confluence portion. Therefore, the first gas introduced into the plurality of auxiliary passages is less likely to be immediately introduced into the confluence portion from the plurality of auxiliary passages, and is distributed over the plurality of auxiliary passages so as to fill the auxiliary passages. Accordingly, the flow distribution (including the flow rate, the flow amount, the pressure, and the like) of the first gas in the flowing direction can be made substantially uniform among the plurality of auxiliary passages. Moreover, the first gas is distributed over the plurality of auxiliary passages so as to fill the auxiliary passages, and therefore, an electrochemical reaction sufficiently occurs in the plurality of auxiliary passages. Accordingly, the reaction efficiency of the electrochemical reaction can be improved.

In another characteristic configuration of the electrochemical element according to the present invention, the discharge structure includes a discharge passing portion through which the first gas flows from the plurality of auxiliary passages to the confluence portion, and a discharge preventing portion that prevents the first gas from flowing from the plurality of auxiliary passages to the confluence portion.

In the discharge structure having the above-mentioned configuration, the discharge preventing portion serves as a barrier for flow of the first gas from the plurality of auxiliary passages to the confluence portion and prevents the first gas from flowing from the plurality of auxiliary passages to the confluence portion. On the other hand, the discharge passing portion introduces the first gas from the plurality of auxiliary passages into the confluence portion. Accordingly, the first gas introduced into the plurality of auxiliary passages does not immediately flow into the confluence portion, the pressure loss increases due to the discharge preventing portion serving as the barrier, and the first gas is distributed over the plurality of auxiliary passages so as to fill the auxiliary passages. Then, the first gas is supplied from the plurality of auxiliary passages to the confluence portion through the discharge passing portion. Accordingly, the flow distribution (including the flow rate, the flow amount, the pressure, and the like) of the first gas in the flow direction is substantially uniform among the auxiliary passages.

In another characteristic configuration of the electrochemical element according to the present invention,
the plate-like support includes a plurality of auxiliary passage forming portions that form the plurality of auxiliary passages, and a plurality of partitioning portions that are each provided between adjacent auxiliary passage forming portions to separate adjacent auxiliary passages, and
the plurality of auxiliary passages formed by the plurality of auxiliary passage forming portions are arranged such that at least one of the auxiliary passages corresponds to the discharge preventing portion in the flowing direction.

With the above-mentioned configuration, the first gas ejected from the plurality of auxiliary passages flows in the flowing direction and collides against the discharge preventing portion. Due to the collision with the discharge preventing portion, the first gas flows in the intersection direction intersecting the flowing direction. That is, the first gas flowing from the plurality of auxiliary passages is not immediately introduced into the confluence portion, but collides against the discharge preventing portion on the upstream side of the confluence portion and flows in the intersection direction. Thereafter, the first gas flows along the ejection from the plurality of auxiliary passages, passes through the discharge passing portion, and is introduced into the confluence portion. As a result of the first gas ejected from the plurality of auxiliary passages being temporarily stored between the plurality of auxiliary passages and the confluence portion as described above, the flow distribution (including the flow rate, the flow amount, the pressure, and the like) of the first gas in the flow direction can be made substantially uniform among the auxiliary passages.

In another characteristic configuration of the electrochemical element according to the present invention, the plurality of partitioning portions are arranged such that any of the partitioning portions corresponds to the discharge passing portion in the flowing direction.

In another characteristic configuration of the electrochemical element according to the present invention, a plurality of the electrochemical elements are stacked in the predetermined stacking direction with annular sealing portions for passing the first gas interposed between the electrochemical elements.

With the above-mentioned configuration, the plurality of electrochemical element are stacked in the predetermined stacking direction with the annular sealing portions interposed therebetween, and therefore, leakage of the first gas can be suppressed between the plurality of electrochemical elements.

In another characteristic configuration of the electrochemical element according to the present invention,
the first gas is introduced into the internal passage via the annular sealing portions, and
a flowing portion through which second gas flows is formed between electrochemical elements that are adjacent to each other in the stacking direction, the second gas being the other of the reducing component gas and the oxidative component gas.

With the above-mentioned characteristic configuration, the internal passage through which the first gas flows is formed inside the plate-like support of each electrochemical element, and the flowing portion through which the second gas flows is formed between adjacent electrochemical elements. Accordingly, in each electrochemical element, an electrochemical reaction can be caused to occur between the first gas supplied from the internal passage and the second gas supplied from the flowing portion.

The following is a more specific description. When the electrochemical element is allowed to function as a fuel cell (electrochemical power generating cell) "that converts chemical energy such as fuel into electric energy", the first gas is one of reducing component gas such as hydrogen gas and oxidative component gas such as air that are consumed in an electrochemical reaction, and the second gas is the other.

When the electrochemical element is allowed to function as an electrolysis cell "that converts electric energy into chemical energy such as fuel", the first gas is one of reducing component gas such as hydrogen gas and oxidative component gas such as oxygen that are generated through an electrochemical reaction, and the second gas is the other.

The plate-like support includes the gas-permeable portion through which gas is permeable between the internal passage, which is located inside the plate-like support, and the outside, and the electrochemical reaction portion that entirely or partially covers the gas-permeable portion and includes the electrode layer, the electrolyte layer, and the counter electrode layer. Therefore, when the electrochemical element is allowed to function as a fuel cell (electrochemical power generating cell), the first gas and the second gas reach the electrochemical reaction portion through a route from the outside of the substrate and a route that connects the internal passage and the gas-permeable portion of the plate-like support, and react with each other in the electrode layer and the counter electrode layer, thus making it possible to cause an electrochemical reaction through which electric power is generated, for example.

When the electrochemical element is allowed to function as an electrolysis cell, the first gas and the second gas are generated through an electrolytic reaction of water or the like when electricity is supplied to the electrochemical reaction portion, and can be discharged through the route on the outside of the plate-like support and the route that connects the gas-permeable portion of the plate-like support and the internal passage.

In another characteristic configuration of the electrochemical element according to the present invention,
a first electrochemical element and a second electrochemical element of the plurality of electrochemical elements are adjacently stacked,
the first gas is introduced into the internal passage of the plate-like support via the annular sealing portions, and
the plate-like support included in the first electrochemical element and the plate-like support included in the second electrochemical element are opposed to each other, an outer face of the plate-like support included in the first electrochemical element on which the electrochemical reaction portion is arranged is electrically connected to an outer face of the plate-like support included in the second electrochemical element that is different from an outer face on which the electrochemical reaction portion is arranged, and a flowing portion through which second gas flows is formed between the two adjacent outer faces along the two outer faces, the second gas being the other of the reducing component gas and the oxidative component gas.

With the above-mentioned characteristic configuration, the electrochemical elements each include the internal passage inside the plate-like support, and the first gas flows in the internal passage via the annular sealing portions. The internal passage includes the distribution portion and the plurality of auxiliary passages. Accordingly, the first gas introduced into the internal passage via the annular sealing portions is introduced into the distribution portion, and thereafter introduced into the plurality of auxiliary passages. In this case, the first gas can be equally distributed from the distribution portion to the plurality of auxiliary passages, and electrochemical output can be equally generated in the electrochemical elements. On the other hand, the second gas flows in the flowing portion that is separated from the internal passage. Accordingly, the flow of the first gas and the flow of the second gas can be separated.

In another characteristic configuration of the electrochemical element according to the present invention,
the plate-like support of each electrochemical element includes a first penetrated portion that forms a supply passage through which the first gas flows, and
the first penetrated portion of each electrochemical element is in communication with an annular hole of an annular sealing portion that is interposed between adjacent electrochemical elements.

With the above-mentioned characteristic configuration, the first gas is supplied to the stack of the plurality of electrochemical elements via the first penetrated portion of each electrochemical element and the annular sealing portion. More specifically, the first gas is introduced into the internal passage via the first penetrated portion of the plate-like support and the annular sealing portion provided between electrochemical elements that are adjacent to each other in the stacking direction. Then, the first gas introduced into the internal passage is introduced into the distribution portion, and thereafter introduced into the plurality of auxiliary passages.

A characteristic configuration of an electrochemical module according to the present invention further includes,
in the flowing portion, a first annular sealing portion serving as the annular sealing portion for separating the first penetrated portion formed in each of the two outer faces from the flowing portion,
wherein the supply passage for supplying the first gas to the internal passage is formed by the first penetrated portion and the first annular sealing portion.

Providing the first annular sealing portion makes it possible to connect the first penetrated portions of the electrochemical elements stacked on each other in the stack such that the first penetrated portions are in communication with each other in a state of being separated from the flowing portion. Accordingly, employing a very simple configuration in which the first penetrated portions of the adjacent electrochemical elements are connected to each other in a gastight manner makes it possible to connect the electrochemical elements such that the electrochemical elements appropriately operate using the first gas and the second gas. Therefore, the electrochemical elements can be used to form an electrochemical module that can be easily produced and is reliable. Also, the electrochemical elements have a structure that is easy to handle during the production of the electrochemical module.

It should be noted that there is no limitation on the shape of the annular sealing portion as long as a configuration is obtained in which the penetrated portions are in communication with each other and leakage of gas can be prevented. That is, it is sufficient that the annular sealing portion has an endless shape provided with an opening portion therein that is in communication with the penetrated portions, and is configured to seal a gap between the adjacent electrochemical elements. The annular sealing portion has, for example, an annular shape. The annular shape may be any of an annular circle, an annular ellipse, an annular square, an annular polygon, and the like.

In another characteristic configuration of the electrochemical module according to the present invention,
- the plate-like support includes a second penetrated portion that forms a discharge passage through which the first gas that has passed through the internal passage flows to the outside of the plate-like support in a surface penetration direction,
- the electrochemical module further includes, in the flowing portion, a second annular sealing portion serving as the annular sealing portion for separating the second penetrated portion formed in each of the two outer faces from the flowing portion, and
- the discharge passage through which the first gas that has passed through the internal passage flows is formed by the second penetrated portion and the second annular sealing portion.

That is, for example, when the electrochemical element is allowed to function as a fuel cell (electrochemical power generating cell), the first gas that has entered the internal passage from the first penetrated portion flows through the internal passage to the electrochemical reaction portion via the gas-permeable portion, and the remainder flows into the second penetrated portion that forms the discharge passage. The discharge passage is formed in the state in which the second penetrated portion is separated from the second gas, and thus the first gas can be collected from the discharge passage independently of the second gas. This discharge passage is formed by the sealing portion as is the case with the supply passage formed by the first penetrated portion. Accordingly, by employing a very simple configuration in which the second penetrated portions of the adjacent electrochemical elements are connected to each other in a gastight manner, the electrochemical elements can be connected such that the second penetrated portions are in communication with each other in a state of being separated from the flowing portion, and the electrochemical elements appropriately operate using the first gas and the second gas. Therefore, the electrochemical elements can be used to form an electrochemical module that can be easily produced and is reliable. Also, the electrochemical elements have a structure that is easy to handle during the production of the electrochemical module.

A characteristic configuration of an electrochemical device according to the present invention includes at least: the above-mentioned electrochemical element or the above-mentioned electrochemical module, and a fuel converter that supplies gas containing a reducing component to the electrochemical element or the electrochemical module, or a fuel converter that converts gas containing a reducing component generated in the electrochemical element or the electrochemical module.

The above-mentioned characteristic configuration includes the electrochemical element or the electrochemical module and the fuel converter that supplies gas containing a reducing component to the electrochemical element or the electrochemical module. Therefore, in a case where the electrochemical module is operated as a fuel cell, by employing a configuration in which hydrogen is generated by the fuel converter such as a reformer from natural gas or the like supplied using an existing raw fuel supply infrastructure, such as city gas, and hydrogen is supplied to the fuel cell, it is possible to realize an electrochemical device including the electrochemical module that has excellent durability, reliability, and performance. Also, it is easy to establish a system for recycling unused fuel gas discharged from the electrochemical module, and therefore, it is possible to realize a highly efficient electrochemical device.

Furthermore, the above-mentioned characteristic configuration includes the electrochemical element or the electrochemical module and the fuel converter that converts gas containing a reducing component generated in the electrochemical element or the electrochemical module. Accordingly, in a case where the electrochemical module is operated as an electrolysis cell, the electrochemical device can be configured to convert, for example, hydrogen generated through an electrolytic reaction of water to methane or the like by reacting hydrogen with carbon monoxide or carbon dioxide in the fuel converter, and by employing this configuration, it is possible to realize an electrochemical device including the electrochemical module that has excellent durability, reliability, and performance.

A characteristic configuration of an electrochemical device according to the present invention includes: the above-mentioned electrochemical element or the above-mentioned electrochemical module; and a power converter that extracts power from the electrochemical element or the electrochemical module or supplies power to the electrochemical element or the electrochemical module.

With the above-mentioned characteristic configuration, the power converter extracts power generated by the electrochemical module or supplies power to the electrochemical module. Thus, as mentioned above, the electrochemical module serves as a fuel cell or an electrolysis cell. Accordingly, with the above-mentioned configuration, it is possible to provide an electrochemical element and the like that can improve the efficiency of converting chemical energy such as fuel into electric energy or can improve the efficiency of converting electric energy into chemical energy such as fuel.

It should be noted that it is preferable to use an inverter as the power converter, for example, because the inverter can be used to boost electrical output obtained from the electrochemical module that has excellent durability, reliability, and performance, and to convert a direct current into an alternating current, thus making it easy to use the electrical output obtained from the electrochemical module.

A characteristic configuration of an energy system according to the present invention includes: the above-mentioned electrochemical element or the above-mentioned electrochemical device; and a waste heat utilization system that reuses heat discharged from the electrochemical element, the electrochemical device, or a fuel converter.

The above-mentioned characteristic configuration includes the electrochemical element or the electrochemical device and the waste heat utilization system that reuses heat discharged from the electrochemical element, the electrochemical device, or the fuel converter, thus making it possible to realize an energy system that has excellent durability, reliability, and performance as well as excellent energy efficiency. It should be noted that it is also possible to realize a hybrid system that has excellent energy efficiency by combination with a power generation system that generates power with use of combustion heat from unused fuel gas discharged from the electrochemical element, the electrochemical device, or the fuel converter.

BRIEF DESCRIPTION OF THE DRAWINGS

FIG. 6 is a cross-sectional view taken along line VI-VI in FIG. 5.

FIG. 7 is a cross-sectional view taken along line VII-VII in FIG. 5.

FIG. 8 is a cross-sectional view taken along line VIII-VIII in FIG. 5.

FIG. 9 is a cross-sectional view taken along line IX-IX in FIG. 5.

DESCRIPTION OF THE INVENTION

Hereinafter, an electrochemical module M and a method for assembling an electrochemical module M according to an embodiment of the present invention will be described. It should be noted that when the positional relationship between layers and the like are described, an electrolyte layer side is referred to as "upper portion" or "upper side", and a first plate-like body side is referred to as "lower portion" or "lower side", with respect to an electrode layer, for example. The effect of the present invention in the case where the electrochemical module M is arranged extending in the vertical direction is the same as that in the case where the electrochemical module M is arranged extending in the horizontal direction, and therefore, "upper" and "lower" may be read as "left" and "right", respectively.

(1) Overall Configuration of Electrochemical Module M

Figure 1:
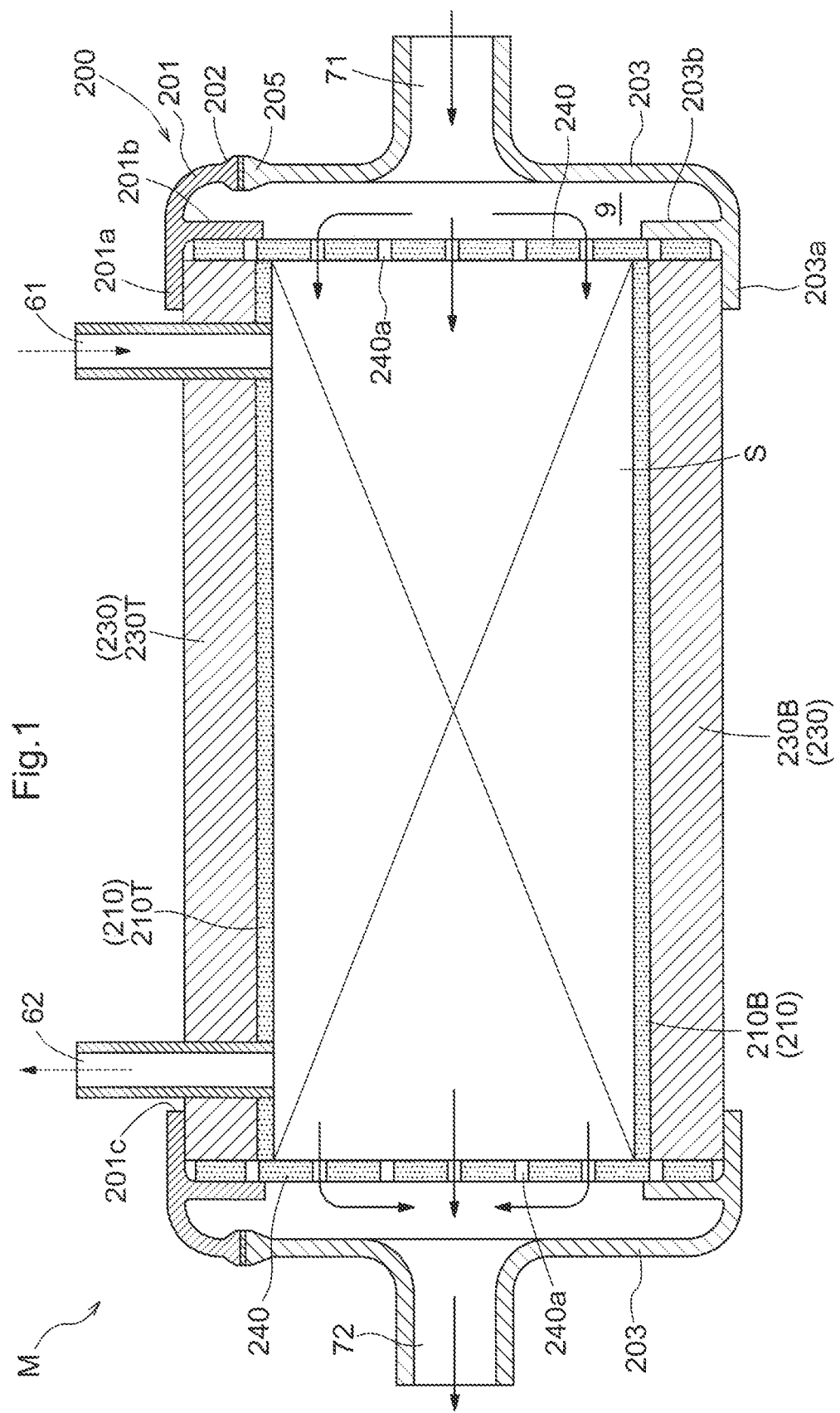
FIG. 1 is a cross-sectional view of an electrochemical module.

The following is a description of the overall configuration of the electrochemical module M. As shown in FIG. 1, the electrochemical module M includes an electrochemical element stack (stack) S, and a container (a housing, a first clamping portion, a second clamping portion) 200 that has a substantially rectangular parallelepiped shape and is internally provided with the electrochemical element stack S. An electrochemical element A (FIG. 4) is an element for generating power and is formed in a plate shape extending from the front side to the back side in the cross-sectional view shown in FIG. 1. The electrochemical element stack S has a configuration in which a plurality of plate-like electrochemical elements A are stacked in a vertical stacking direction (+Z direction and −Z direction (Z direction), which will be described later) in the cross-sectional view shown in FIG. 1. In the description of this embodiment, a SOFC (Solid Oxide Fuel Cell) is used as an example of the electrochemical element A.

The electrochemical module M also includes a first gas supply portion 61 for supplying first gas to the electrochemical element stack S from the outside of the container 200, and a first gas discharge portion 62 for discharging the first gas used in a reaction in the electrochemical element stack S.

Figure 2:
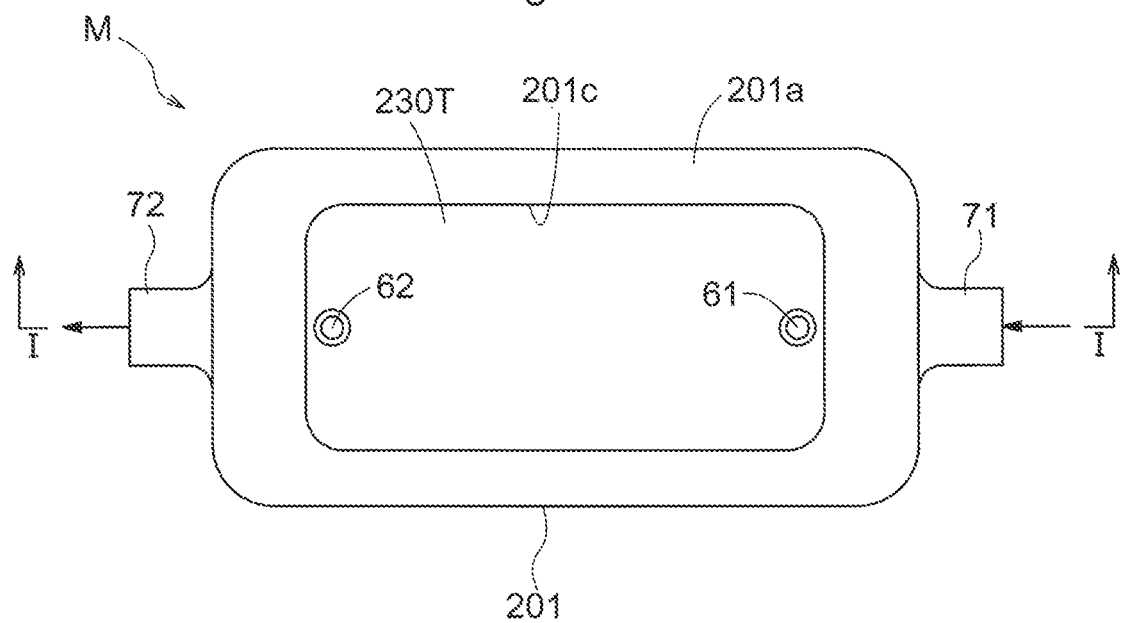
FIG. 2 is a top view of the electrochemical module.
Figure 3:
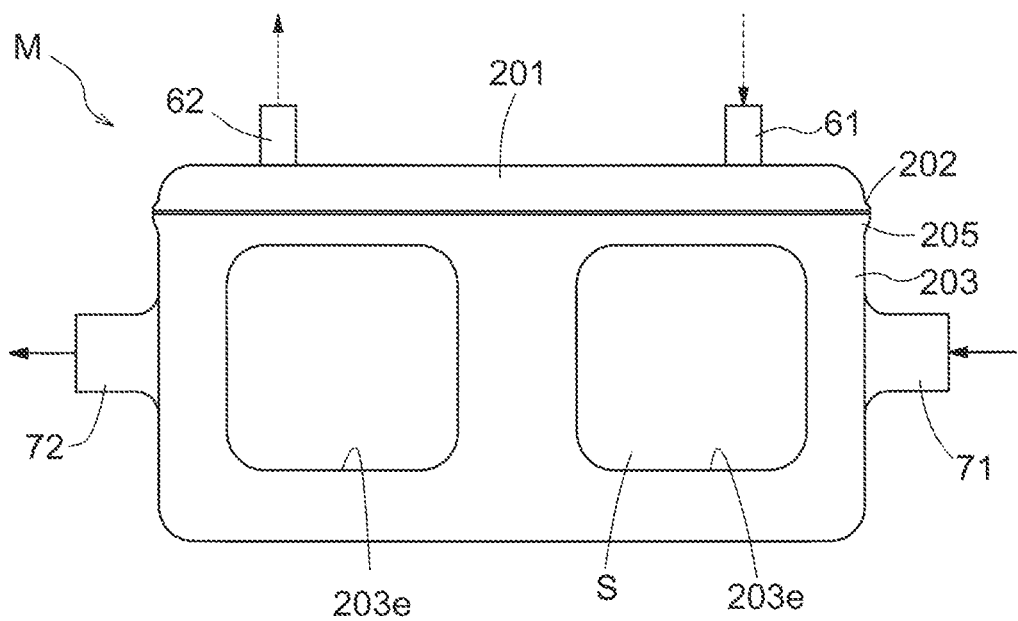
FIG. 3 is a side view of the electrochemical module.

As shown in FIGS. 1 to 3, the container 200 is provided with a second gas supply portion 71 for supplying second gas to the electrochemical element stack S from the outside of the container 200. The second gas used in a reaction in the electrochemical element stack S is discharged from a second gas discharge portion 72 provided in the container 200 to the outside.

Here, for example, the first gas is reducing component gas such as fuel gas, and the second gas is oxidative component gas such as air.

The electrochemical module M includes perforated plate members 240 on the two side faces of the electrochemical element stack S in the cross-sectional view shown in FIG. 1. Each of the perforated plate members 240 is a plate-like member that corresponds to the two side faces of the electrochemical element stack S and extends in the direction in which the electrochemical elements A are stacked, and is preferably made of an insulating material such as mica for the purpose of preventing electric short (short circuit) in the electrochemical module M. The perforated plate member 240 is provided with a plurality of holes 240a that pass through the perforated plate member 240 in the plane direction of the electrochemical element stack S.

Accordingly, the electrochemical element stack S is configured such that fuel gas is supplied from the first gas supply portion 61, air is supplied from the second gas supply portion 71 through the holes 240a of the perforated plate member 240, and power is generated through an electrochemical reaction between the fuel gas and oxygen in the air. The fuel gas used in the electrochemical reaction is discharged from the first gas discharge portion 62 to the outside. The air used in the electrochemical reaction is introduced into the second gas discharge portion 72 through the holes 240a of the perforated plate member 240, and is discharged from the second gas discharge portion 72 to the outside.

It should be noted that, here, the perforated plate members 240 are provided adjacent to the two side faces of the electrochemical element stack S, but this configuration is not essential, and configurations are also possible in which only one of them is provided, or in which both of them are omitted.

The electrochemical module M includes, on the upside of the electrochemical element stack S, an upper insulator 210T and an upper plate (first clamping portion) 230T, which are arranged in the stated order from the electrochemical element stack S side toward the outside. Similarly, the electrochemical module M includes, on the underside of the electrochemical element stack S, a lower insulator 210B and a lower plate (second clamping portion) 230B, which are arranged in the stated order from the electrochemical element stack S side toward the outside.

The electrochemical element stack S will be described in detail later.

(2) Insulator, Plate, and Container

The following is a further description of insulators (upper insulator 210T and lower insulator 210B) 210, plates (upper plate 230T and lower plate 230B) 230, and the container 200.

The upper insulator 210T is a plate-like member and is arranged so as to cover the top flat face (first flat face) of the electrochemical element stack S. The upper insulator 210T is made of, for example, hard mica, and electrically insulates the electrochemical element stack S from the outside.

The upper plate 230T is a plate-like member, is arranged on the top of the upper insulator 210T, and is made of a ceramics-based material such as 99 alumina that has a high flexural strength at a high temperature.

The electrochemical element stack S and a pair of the upper insulator 210T and the lower insulator 210B are sandwiched between the upper plate 230T and the lower plate 230B with predetermined clamping pressure applied by the container 200. Here, the clamping pressure refers to, for example, pressure per unit area such as 1 mm².

The lower insulator 210B is arranged so as to cover the bottom flat face (second flat face) of the electrochemical element stack S. The lower plate 230B is arranged on the underside of the lower insulator 210B. The lower insulator 210B and the lower plate 230B are similar to the upper insulator 210T and the upper plate 230T, respectively.

As shown in FIGS. 1 to 3, the container 200 that is internally provided with the electrochemical element stack S has a substantially rectangular parallelepiped shape. The container 200 includes an upper cover (first clamping portion) 201 having a box shape whose bottom portion is open, and a lower cover (second clamping portion) 203 whose top portion is open. A coupling portion 202 is provided on the end face of the upper cover 201 that is opposed to the lower cover 203, and a coupling portion 205 is provided on the end face of the lower cover 203 that is opposed to the upper cover 201. The upper cover 201 and the lower cover 203 are coupled to each other by, for example, welding the coupling portion 202 and the coupling portion 205 to each other, and thus a space having a rectangular parallelepiped shape is formed therein.

In this embodiment, as shown in FIG. 1, the depth of the lower cover 203 in the vertical direction (direction in which the electrochemical elements A are stacked) is larger than the depth of the upper cover 201. However, it is sufficient that the upper cover 201 and the lower cover 203 can form a space therein when integrated, and the relationship between their depths is not limited to the above-mentioned relationship. For example, the depth of the upper cover 201 may be larger than that of the lower cover 203.

As shown in FIGS. 1 to 3, at the center in the vertical direction of the container 200, the second gas supply portion 71 and the second gas discharge portion 72 are respectively formed in the two side walls of the lower cover 203 that are opposed to each other.

It should be noted that, here, the lower cover 203 is provided with the second gas supply portion 71 and the second gas discharge portion 72. However, the positions at which the second gas supply portion 71 and the second gas discharge portion 72 are formed are not limited to the above-mentioned positions, and they may be formed at any positions on the container 200. For example, the upper cover 201 may be provided with the second gas supply portion 71 and the second gas discharge portion 72.

As shown in FIGS. 1 and 2, the upper cover 201 is provided with an opening 201c that is slightly smaller in size than the area surrounded by the outer edge of the upper cover 201. In the cross-sectional view shown in FIG. 1, the end portion on the inner side that is adjacent to the opening 201c and faces the electrochemical element stack S branches into a first end portion 201a and a second end portion 201b. The first end portion 201a extends by a predetermined length toward the inside of the container 200 in the plane direction, and the second end portion 201b branches off from the first end portion 201a and extends by a predetermined length toward the lower portion of the container 200. The first end portion 201a and the second end portion 201b form an angle of substantially 90° in the cross-sectional view and form an L-shaped corner portion. This L-shaped corner portion is formed along the outer edge on the inner side of the outer edge in the top view of the upper cover 201 shown in FIG. 2. Accordingly, as shown in FIGS. 1 and 2, the opening 201c that is slightly smaller in size than the area surrounded by the outer edge of the upper cover 201 is formed by the end of the first end portion 201a in the top face of the upper cover 201.

In the same manner as in the upper cover 201, the lower cover 203 includes a first end portion 203a and a second end portion 203b that form an angle of substantially 90° and form an L-shaped corner portion in the cross-sectional view shown in FIG. 1. As shown in FIG. 1, an opening 203c that is slightly smaller in size than the area surrounded by the outer edge of the lower cover 203 is formed by the end of the first end portion 203a.

As shown in FIG. 1, the upper ends of the two perforated plate members 240, the upper insulator 210T, and the upper plate 230T are fitted onto the L-shaped corner portion formed by the first end portion 201a and the second end portion 201b of the upper cover 201. Specifically, the top face of the outer peripheral end portion of the upper plate 230T extending in the plane direction of the electrochemical element stack S is in contact with the bottom face of the first end portion 201a (a portion of the inner face of the L-shaped corner portion) and is supported thereby. The outer face of the upper end portion of each of the perforated plate members 240 extending along the side face of the electrochemical element stack S is in contact with the inner side face of the second end portion 201b (a portion of the inner face of the L-shaped corner portion) and is supported thereby. The upper insulator 210T is supported by the L-shaped corner portion formed by the first end portion 201a and the second end portion 203b, via the upper plate 230T and the perforated plate members 240.

Similarly, the lower ends of the two perforated plate members 240, the lower insulator 210B, and the lower plate 230B are fitted onto a pair of L-shaped corner portions that are opposed to each other in the plane direction of the lower cover 203.

The top face of the electrochemical element stack S is supported by the upper cover 201 via the upper plate 230T and the upper insulator 210T. The bottom face of the electrochemical element stack S is supported by the lower cover 203 via the lower plate 230B and the lower insulator 210B.

The upper cover 201 and the lower cover 203 having these configurations are coupled to each other by, for example, welding the coupling portion 202 and the coupling portion 205 to each other in the state in which the electrochemical element stack S, the upper insulator 210T, the lower insulator 210B, the upper plate 230T, the lower plate 230B, and the like are sandwiched between the upper cover 201 and the lower cover 203 from above and below. While the upper cover 201 and the lower cover 203 are coupled to each other, predetermined clamping pressure is applied to the electrochemical element stack S and the like. That is, in the state in which the upper cover 201 and the lower cover 203 are coupled to each other, predetermined clamping pressure is applied to the electrochemical element stack S, the upper insulator 210T, the lower insulator 210B, the upper plate 230T, and the lower plate 230B.

It should be noted that, as shown in FIG. 3, openings 203e are formed in the side face of the lower cover 203. Accordingly, portions of the side face of the electrochemical element stack S are exposed from the openings 203e. Providing the container 200 with the above-described openings 201c and 203c and the openings 203e makes it possible to reduce the weight of the container 200 and reduce the amount of the material necessary for the container 200. It should be noted that, when electric short (short circuit) may occur due to contact between the side face of the electrochemical element stack S and one or both of the upper cover 201 and the lower cover 203, a side insulator 245 made of a material such as mica is provided between the electrochemical element stack S and the side face of the upper cover 201 or the lower cover 203.

The lower cover 203 and the upper cover 201 of the container 200 are linked to each other and thus apply clamping pressure to the electrochemical element stack S. Examples of the material of such a container 200 include ferrite-based stainless steel, martensite-based stainless steel, and complexes between ceramics and the above-mentioned stainless steel. These materials have thermal expansion rates smaller than that of austenite-based stainless steel. Regarding the thermal expansion rate of ferrite-based stainless steel, SUS430 has a thermal expansion rate of about $11 \times 10^{-6}/°$ C. Regarding the thermal expansion rate of martensite-based stainless steel, SUS403 and SUS420J1 have a thermal expansion rate of about $10.4 \times 10^{-6}/°$ C., and SUS410 and SUS440C have a thermal expansion rate of about $10.1 \times 10^{-6}/°$ C. Also, it is preferable to select a material that has excellent corrosion resistance as the material of the container 200.

It is preferable that a material of the electrochemical element stack S is similar to the material of the container 200. In other words, it is preferable that a material of the electrochemical element stack S has a thermal expansion rate as large as that of the container 200. In this case, substrates of the electrochemical element stack S and the container 200 thermally expand to the same degree, for example, at the time of power generation when the electrochemical elements A become hot. Accordingly, it is possible, for example, to reduce a difference in thermal expansion between the substrates of the electrochemical elements A and the container 200 and suppress damage or the like on the substrates.

(3) Method for Assembling Electrochemical Module M

Next, a method for assembling the above-mentioned electrochemical module M will be described.

The electrochemical element stack S is prepared by stacking a plurality of electrochemical elements A. The configuration of the electrochemical element stack S and a method for manufacturing the electrochemical element stack S will be described later.

The container 200 for housing the electrochemical element stack S is also prepared. The container 200 can be manufactured using, for example, a lost-wax casting method, but the manufacturing method is not limited thereto. When the lost-wax casting method is used, a model corresponding to the external shape of the container 200 is manufactured using, for example, a thermoplastic substance such as beeswax or pine resin. A fire-resistant material made of silica sand, lime powder, and the like is used to cover this model. Thereafter, the model covered by the fire-resistant material is heated, and thus the model made of the thermoplastic substance is melted and removed. Accordingly, a cavity corresponding to the model having the shape of the container 200 is formed inside the fire-resistant material. The material of the container 200 is injected into this cavity and solidified, and then the fire-resistant material is removed. Thus, the container 200 including the upper cover 201 and the lower cover 203 is manufactured using the lost-wax casting method. It should be noted that the upper cover 201 and the lower cover 203 may be separately manufactured.

Next, for example, the two perforated plate members 240 are arranged on the two side faces of the electrochemical element stack S, and the insulator 210 and the plate 230 are arranged one by one on each of the top flat face and the bottom flat face of the electrochemical element stack S, and these members are housed in the lower cover 203 while this state is maintained. The lower cover 203 is covered by the upper cover 201, positional adjustment is performed such that predetermined clamping pressure is applied to the electrochemical element stack S, and then the lower cover 203 and the upper cover 201 are linked to each other through welding or the like. The electrochemical module M is thus assembled.

When the container 200 is manufactured using the lost-wax casting method as mentioned above, the cost can be reduced due to a reduction in thickness, manufacturing accuracy, and mass production.

In this embodiment, forming the box-shaped container 200 makes it possible to provide a space for a manifold for supplying air from the second gas supply portion 71 to the electrochemical element stack S.

(4) Specific Configuration of Electrochemical Module M

Next, a specific configuration of the electrochemical module M will be described with reference to FIGS. 1, 4 and 5, for example. Details of the electrochemical element stack S shown in FIG. 1 are shown in FIG. 4.

As shown in FIGS. 4 to 21, for example, the stacking direction of the electrochemical element stack S includes the +Z direction and −Z direction (Z direction). The direction in which the first gas flows between a first plate-like body 1 and a second plate-like body 2 from the first gas supply portion 61 side toward the first gas discharge portion 62 side, and, similarly, the direction in which the second gas flows between the first plate-like body 1 and the second plate-like body 2 from the second gas supply portion 71 side toward the second gas discharge portion 72 side include the +X direction and −X direction (X direction) intersecting the +Z direction and −Z direction (Z direction). The direction that intersects the +Z direction and −Z direction (Z direction) and the +X direction and −X direction (X direction) includes the +Y direction and −Y direction (Y direction). The XZ plane, the XY plane, and the YZ plane are substantially orthogonal to one another.

Figure 4:
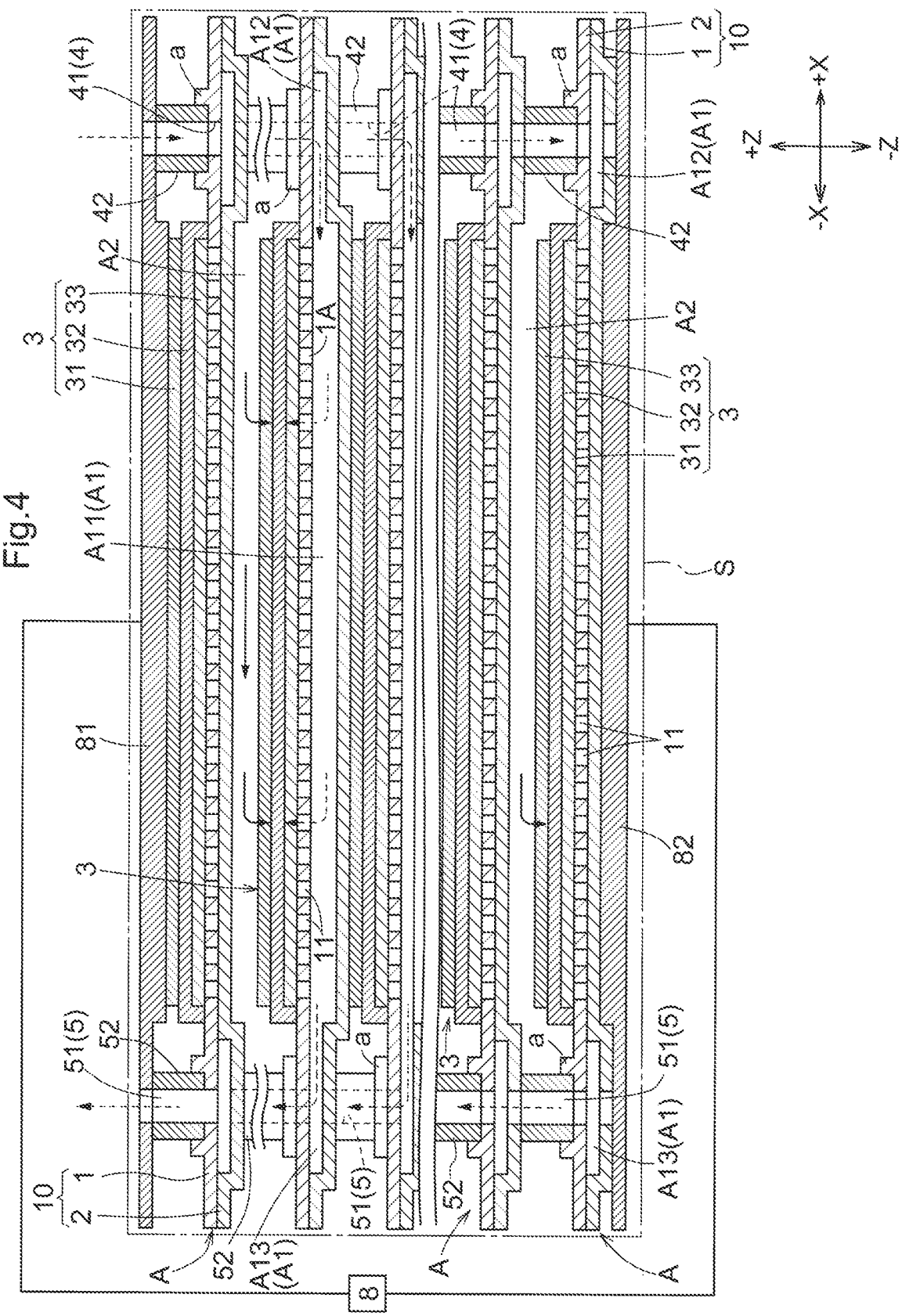
FIG. 4 is a schematic view of the electrochemical module.

As shown in FIGS. 1 and 4, the electrochemical module M includes: the container 200 (the upper cover 201 and the lower cover 203) that is internally provided with the electrochemical element stack S; the first gas supply portion 61 for supplying the first gas from the outside of the container 200 to internal passages A1 via a supply passage 4; the first gas discharge portion 62 for discharging the first gas used in a reaction; the second gas supply portion 71 for supplying the second gas from the outside of the container 200 to flowing portions A2; the second gas discharge portion 72 for discharging the second gas used in a reaction; and an output portion 8 to which output generated by an electrochemical reaction in an electrochemical reaction portion 3 is provided, wherein a distribution chamber 9 for distributing and supplying the second gas supplied from the second gas supply portion 71, to the flowing portions A2 is provided inside the container 200.

The distribution chamber 9 is a space located on a side for supplying the second gas to the electrochemical element stack S with respect to the electrochemical element stack S, and openings are formed on the space side and the flowing portions A2 are in communication with the space therethrough.

In a state of being held between two collectors 81 and 82, the electrochemical element stack S is provided inside the container 200. The output portion 8 extends from the collectors 81 and 82 and is connected to a power supply target provided outside the container 200 so as to freely supply power thereto. Furthermore, the electrochemical element stack S is housed in the container 200 such that at least one of the collectors 81 and 82 is electrically insulated from the container 200 and the container 200 is hermetically sealed against the first gas.

Figure 5:
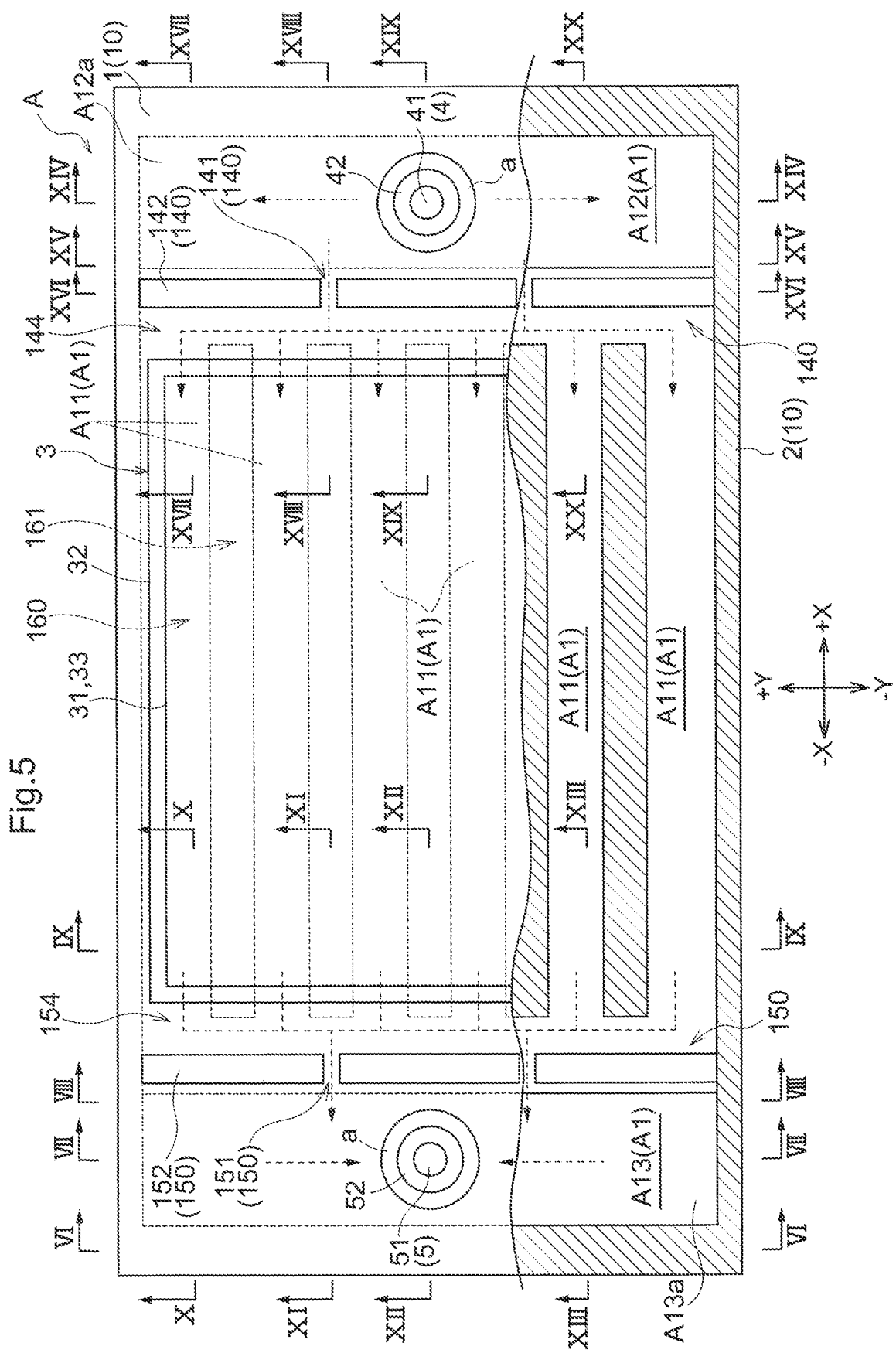
FIG. 5 is a schematic view of an electrochemical element.

Accordingly, in the electrochemical module M, the fuel gas (also referred to as the "first gas") is supplied from the first gas supply portion 61 and air (also referred to as the "second gas") is supplied from the second gas supply portion 71, so that the fuel gas enters as indicated by dashed arrows and the air enters as indicated by solid arrows as shown in FIGS. 1, 4, 5, and the like.

The fuel gas supplied from the first gas supply portion 61 is introduced into the supply passage 4 through a first penetrated portion 41 of the topmost electrochemical element A of the electrochemical element stack S, and flows from the supply passage 4 partitioned by first annular sealing portions 42 into the internal passage A1 in all of the electrochemical elements A. Moreover, the air supplied from the second gas supply portion 71 temporarily flows into the distribution chamber 9, and then flows into the flowing portions A2 formed between the electrochemical elements A. In this embodiment, the flowing direction in which the fuel gas flows in the internal passage A1 along a flat face of a plate-like support 10 is a direction extending from the +X side toward the −X side. Similarly, the flowing direction in which the air flows in the flowing portion A2 along a flat face of the plate-like support 10 is a direction extending from the +X side toward the −X side.

Incidentally, when the second plate-like body 2 (a portion of the plate-like support 10) is considered as a base, the internal passage A1 is formed between the first plate-like body 1 (a portion of the plate-like support 10) and the second plate-like body 2 at a position at which a portion of the second plate-like body 2 with a wavelike plate-like shape bulges from the first plate-like body 1, and such a portion comes into contact with the electrochemical reaction portion 3 of the adjacent electrochemical element A and can be electrically connected thereto. On the other hand, a portion of the second plate-like body 2 with a wavelike plate-like shape that is in contact with the first plate-like body 1 is electrically connected to the first plate-like body 1, and the flowing portion A2 is formed between the second plate-like body 2 and the electrochemical reaction portion 3 of the adjacent electrochemical element A.

Figure 21:
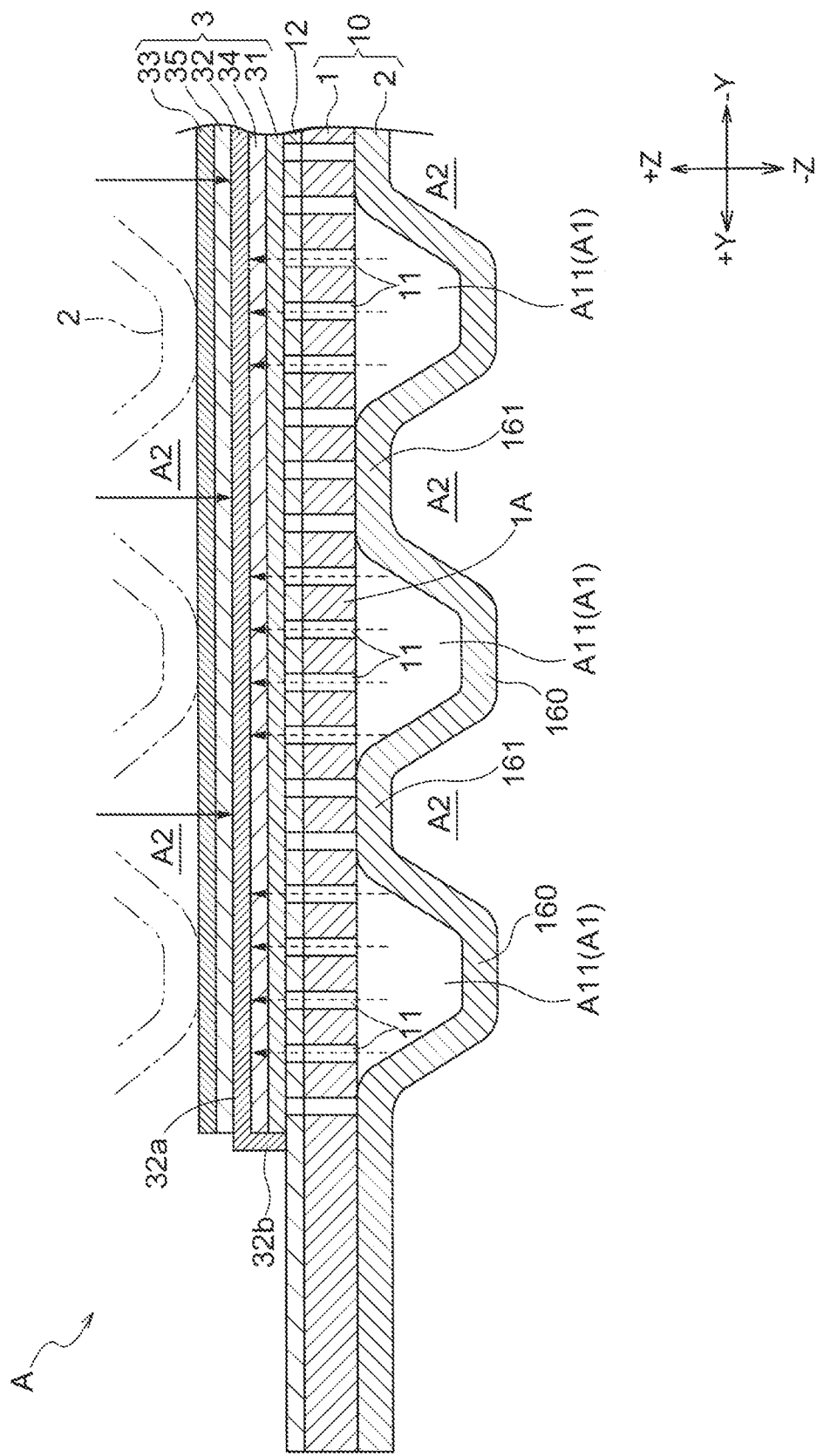
FIG. 21 is an enlarged view of a relevant portion of an electrochemical reaction portion.

Portions of FIG. 21 and the like show a cross section of an electrochemical element A including the internal passage A1 and a cross section of an electrochemical element A including the flowing portion A2 that are aligned for the sake of convenience. The fuel gas supplied from the first gas supply portion 61 reaches the distribution portion A12 (see FIGS. 5 to 8 and the like), flows and spreads in the width direction of one end portion via the distribution portion A12, and reaches auxiliary passages A11 of the internal passage A1 (see FIGS. 5 to 9 and the like). In this case, the first gas can be equally distributed from the distribution portion A12 to the auxiliary passages A11, thus making it possible to allow the electrochemical elements to equally generate electrochemical output.

As shown in FIG. 5 and the like, the internal passage A1 includes a distribution portion A12, a plurality of auxiliary passages A11, and a confluence portion A13, which will be described later. The internal passage A1 further includes a supply buffer portion 144 provided between the distribution portion A12 and the plurality of auxiliary passages A11, and a discharge buffer portion 154 provided between the plurality of auxiliary passages A11 and the confluence portion A13.

The internal passage A1 is formed by a space formed between the first plate-like body 1 and the second plate-like body 2, which are opposed to each other. In this embodiment, the first plate-like body 1 has a flat shape and is provided with a gas-permeable portion 1A, which will be described later. The second plate-like body 2 includes portions protruding upward with respect to the stacking direction and portions recessed downward. Accordingly, when the first plate-like body 1 and the second plate-like body 2 are combined in a state of being opposed to each other, the portions of the second plate-like body 2 protruding upward come into contact with the first plate-like body 1. A space partitioned into the distribution portion A12, the supply buffer portion 144, the plurality of auxiliary passages A11, the discharge buffer portion 154, the confluence portion A13, and the like is formed by the portions of the second plate-like body 2 recessed downward and the first plate-like body 1.

A supply structure 140 is provided between the distribution portion A12 and the plurality of auxiliary passages A11 in a direction extending in the direction in which the fuel gas flows (the +X direction and −X direction (X direction)), which will be described in detail later. Due to the supply structure 140, the fuel gas is temporarily stored in the distribution portion A12, and supply of the fuel gas from the distribution portion A12 to the plurality of auxiliary passages A11 is limited.

A discharge structure 150 is provided between the plurality of auxiliary passages A11 and the confluence portion A13 in a direction extending in the direction in which the fuel gas flows. Due to the discharge structure 150, discharge of the fuel gas from the plurality of auxiliary passages A11 to the confluence portion A13 is limited.

The fuel gas flows in the first gas supply portion 61, the first annular sealing portion 42, the first penetrated portion 41, and the like, and is supplied to the distribution portion A12 of each electrochemical element A. The fuel gas supplied to the distribution portion A12 is temporarily stored in the distribution portion A12 due to the supply structure 140. Then, the fuel gas is introduced into the plurality of auxiliary passages A11 from the distribution portion A12.

The fuel gas that has entered the auxiliary passages A11 flows in the auxiliary passages A11, and enters an electrode layer 31 and an electrolyte layer 32 through the gas-permeable portion 1A. Moreover, the fuel gas further flows in the auxiliary passages A11 together with the fuel gas used in an electrochemical reaction. After reaching the ends of the plurality of auxiliary passages A11 in the flowing direction, the fuel gas flows into the confluence portion A13 in a state in which flowing into the confluence portion A13 is partially limited due to the discharge structure 150. The fuel gas that has entered the confluence portion A13 flows in the confluence portion A13, the second penetrated portion 51, the second annular sealing portion 52, and the like. Then, the fuel gas is discharged to the outside of the container 200 from the first gas discharge portion 62 together with the fuel gas used in an electrochemical reaction in other electrochemical elements A.

On the other hand, the air supplied from the second gas supply portion 71 enters the flowing portions A2 via the distribution chamber 9, and then can enter counter electrode layers 33 and the electrolyte layers 32. Moreover, the air further flows in the flowing portions A2 along the electrochemical reaction portions 3 together with air used in an electrochemical reaction, and is discharged from the second gas discharge portion 72 to the outside of the container 200.

With this configuration, the electrochemical elements A are connected in series between the collectors 81 and 82 due to the contact between the second plate-like body 2 and the electrochemical reaction portion 3 of the adjacent electrochemical elements A, and thus power generated following the fuel gas flow and the air flow in the electrochemical reaction portions 3 is extracted from the output portion 8 as composite output.

The configuration of the electrochemical element stack S will be described below in detail.

(5) Specific Configuration of Electrochemical Element Stack S

Next, a specific configuration of the electrochemical element stack S will be described. The electrochemical element stack S is formed by stacking a plurality of electrochemical elements A.

The electrochemical element A will be described with reference to FIGS. 4 to 22, for example.

Electrochemical Element

As shown in FIGS. 5 to 22, for example, the electrochemical element A includes the plate-like support 10 provided with the internal passage A1 formed between the faces of the conductive first plate-like body 1 and the conductive second plate-like body 2 that are opposed to each other.

The plate-like support 10 includes the gas-permeable portion 1A through which gas is permeable between the internal passage A1, which is located inside the plate-like support 10, and the outside at one or more portions of the first plate-like body 1 and the second plate-like body 2 included in the plate-like support 10, and the electrochemical reaction portion 3 that entirely or partially covers the gas-permeable portion 1A and includes the film-like electrode layer 31, the film-like electrolyte layer 32, and a film-like counter electrode layer 33 in the stated order (see FIGS. 9 to 13 and 17 to 21, for example).

Moreover, the first penetrated portion 41 forming the supply passage 4 for supplying the first gas that is one of reducing component gas such as fuel gas and oxidative component gas such as air from the outside in a surface penetration direction to the internal passage A1 is provided at one end portion of the plate-like support 10 (see FIGS. 5 and 14 to 20, for example), and the second penetrated portion 51 forming a discharge passage 5 for discharging the first gas that has passed through the internal passage A1 to the outside in the surface penetration direction of the plate-like support is provided at the other end portion of the plate-like support 10 (see FIGS. 5 to 13, for example; it is understood that the supply passage 4 and the like and the discharge passage 5 and the like are symmetrical to each other and have a similar structure).

Plate-Like Support (a) Configuration of Plate-Like Support (a1) Overall Configurations and Materials of First Plate-Like Body and Second Plate-Like Body The first plate-like body 1 serves to maintain the strength of the electrochemical element A by supporting the electrochemical reaction portion 3 including the electrode layer 31, the electrolyte layer 32, and the counter electrode layer 33. A material that has excellent electron conductivity, thermal resistance, oxidation resistance, and corrosion resistance is used as the material of the first plate-like body 1. Examples thereof include ferrite-based stainless steel, austenite-based stainless steel, and a nickel-based alloy.

In particular, an alloy containing chromium is favorably used. In this embodiment, the first plate-like body 1 is made of a Fe—Cr based alloy that contains Cr in an amount of 18 mass % or more and 25 mass % or less, but a Fe—Cr based alloy that contains Mn in an amount of 0.05 mass % or more, a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, a Fe—Cr based alloy that contains Ti and Zr, a total content of Ti and Zr being 0.15 mass % or more and 1.0 mass % or less, and a Fe—Cr based alloy that contains Cu in an amount of 0.10 mass % or more and 1.0 mass % or less are particularly favorable.

The plate-like support 10 is formed by welding and integrating peripheral portions 1a of the second plate-like body 2 and the first plate-like body 1 in a state in which the second plate-like body 2 and the first plate-like body 1 are stacked (see FIGS. 6 to 20, for example). The second plate-like body 2 may be divided into a plurality of portions with respect to the first plate-like body 1. On the contrary, the first plate-like body 1 may be divided into a plurality of portions with respect to the second plate-like body 2. Another means such as bonding or fitting can be employed as the integrating means instead of welding. Portions other than the peripheral portions 1a may be integrated as long as the internal passage can be formed separate from the outside.

The first plate-like body 1 includes the gas-permeable portion 1A obtained by forming a large number of through holes 11 that penetrate the surface on the front side and the surface on the back side (see FIGS. 9 to 13 and 17 to 20, for example). It should be noted that the through holes 11 can be formed in the first plate-like body 1 by, for example, laser processing or the like. The through holes 11 have a function of transmitting gas from the surface on the back side of the first plate-like body 1 to the surface on the front side thereof. It is preferable that the gas-permeable portion 1A is provided in a region of the first plate-like body 1 that is smaller than the region in which the electrode layer 31 is provided.

A metal oxide layer 12 (which will be described later: see FIG. 21, for example) serving as a diffusion suppressing layer is provided on the surface of the first plate-like body 1. That is, the diffusion suppressing layer is formed between the first plate-like body 1 and the electrode layer 31, which will be described later. The metal oxide layer 12 is provided not only on the surface of the first plate-like body 1 exposed to the outside but also the surface (interface) that is in contact with the electrode layer 31. The metal oxide layer 12 can also be provided on the inner faces of the through holes 11. Element interdiffusion that occurs between the first plate-like body 1 and the electrode layer 31 can be suppressed due to this metal oxide layer 12. For example, when ferrite-based stainless steel containing chromium is used in the first plate-like body 1, the metal oxide layer 12 is mainly made of a chromium oxide. The metal oxide layer 12 containing the chromium oxide as the main component suppresses diffusion of chromium atoms and the like of the first plate-like body 1 to the electrode layer 31 and the electrolyte layer 32. The metal oxide layer 12 need only have such a thickness that allows both high diffusion preventing performance and low electric resistance to be achieved.

The metal oxide layer 12 can be formed using various techniques, but it is favorable to use a technique of oxidizing the surface of the first plate-like body 1 to obtain a metal oxide. Also, the metal oxide layer 12 may be formed on the surface of the first plate-like body 1 by using a spray coating technique (a technique such as thermal spraying technique, an aerosol deposition technique, an aerosol gas deposition technique, a powder jet deposition technique, a particle jet deposition technique, or a cold spraying technique), a PVD technique such as a sputtering technique or PLD technique, or a CVD technique, or may be formed by plating and oxidation treatment. Furthermore, the metal oxide layer 12 may also contain a spinel phase that has high electrical conductivity, or the like.

When a ferrite-based stainless steel material is used to form the first plate-like body 1, its thermal expansion coefficient is close to that of YSZ (yttria-stabilized zirconia), GDC (gadolinium-doped ceria; also called CGO), or the like, which is used as the material of the electrode layer 31 and the electrolyte layer 32. Accordingly, even if low and high temperature cycling is repeated, the electrochemical element A is not likely to be damaged. Therefore, this is preferable due to being able to realize an electrochemical element A that has excellent long-term durability. It should be noted that the first plate-like body 1 is provided with the plurality of through holes 11 that penetrate the surface on the front side and the surface on the back side. It should be noted that the through holes 11 can be provided in the first plate-like body 1 through, for example, mechanical, chemical, or optical piercing processing. The through holes 11 have a function of transmitting gas from the surface on the back side of the first plate-like body 1 to the surface on the front side thereof. Porous metal can also be used to impart gas permeability to the first plate-like body 1. For example, a metal sintered body, a metal foam, or the like can also be used as the first plate-like body 1.

Both faces on the front side and the back side of the second plate-like body 2 are formed in a wavelike shape. A face on a side opposite to the face that delimits and forms the internal passage A1 is electrically connected to the electrochemical reaction portion 3 of the adjacent electrochemical element A.

Passages formed near the portions of the wavelike second plate-like body 2 that are in contact with the first plate-like body 1 function as the flowing portions A2.

The plurality of auxiliary passages A11 are provided in parallel along the long side of the rectangular plate-like support 10, and form the internal passage A1 extending from the supply passage 4 provided at one end portion to the discharge passage 5 provided at the other end portion. A connection portion where the first penetrated portion 41 and the internal passage A1 are connected to each other is provided with the distribution portion A12 that is formed by bulging the second plate-like body 2 downward from the portion thereof in contact with the first plate-like body 1 and distributes the first gas supplied from the first penetrated portion 41 to the auxiliary passages A11 (see FIGS. 5 and 14 to 20, for example), and a connection portion where the second penetrated portion 51 and the internal passage A1 are connected to each other is provided with the confluence portion A13 that is formed by bulging the second plate-like body 2 downward from the portion thereof in contact with the first plate-like body 1, and collects the first gas flowing in the auxiliary passages A11 and introduces it into the second penetrated portion 51 (see FIGS. 5 to 13, for example; it is understood that the supply passage 4 and the like and the discharge passage 5 and the like are symmetrical to each other and have a similar structure).

The material of the second plate-like body 2 is preferably a heat resistant metal, and more preferably the same material as that of the first plate-like body 1 from the viewpoint of reducing a difference in thermal expansion between the second plate-like body 2 and the first plate-like body 1 and ensuring the reliability of the joining state due to welding or the like.

The electrode layer 31, the electrolyte layer 32, the counter electrode layer 33, and the like are formed on the top face of the plate-like support 10 constituted by the first plate-like body 1 and the second plate-like body 2 described above. That is, the electrode layer 31, the electrolyte layer 32, the counter electrode layer 33, and the like are supported by the plate-like support 10, and it is possible to realize an electrochemical element A that has high strength and excellent reliability and durability. A plate-like support 10 that is made of metal has excellent processability, and therefore is preferable. Furthermore, even if inexpensive metal is used for the plate-like support 10, the obtained plate-like support 10 has high strength, and accordingly, thicknesses of the electrode layer 31, the electrolyte layer 32, and the like, which are expensive, can be reduced, and a low-cost electrochemical element A can be realized with a reduced material cost and a reduced processing cost, which is preferable.

(a2) Configurations of Internal Passage and Second Plate-Like Body

The configuration of the internal passage A1 formed by arranging the first plate-like body 1 and the second plate-like body 2 in a state of being opposed to each other will be further described.

In this embodiment, the internal passage A1 is formed by the inner faces of the first plate-like body 1 having a flat shape and the second plate-like body 2 formed in an uneven shape including portions protruding upward (in the +Z direction) in the stacking direction or portions recessed downward (in the −Z direction) in the stacking direction, the first plate-like body 1 and the second plate-like body 2 being combined in a state of being opposed to each other. The internal passage A1 includes the distribution portion A12, the supply buffer portion 144, the plurality of auxiliary passages A11, the discharge buffer portion 154, and the confluence portion A13. Moreover, the internal passage A1 further includes supply passing portions 141 (portions of the supply structure 140) and discharge passing portions 151 (portions of the discharge structure 150) through which the first gas passes.

It should be noted that the structure on the supply passage 4 side on which the first gas supply portion 61, the first annular sealing portion 42, the first penetrated portion 41, and the like are provided and the structure on the discharge passage 5 side on which the first gas discharge portion 62, the second annular sealing portion 52, the second penetrated portion 51, and the like are provided are symmetrical to each other. FIGS. 6 to 8, FIGS. 10 to 13, and the like show cross-sectional views of the discharge passage 5 side on which the first gas discharge portion 62, the second annular sealing portion 52, the second penetrated portion 51, and the like are provided. On the other hand, FIGS. 14 to 20 and the like show cross-sectional views of the supply passage 4 side on which the first gas supply portion 61, the first annular sealing portion 42, the first penetrated portion 41, and the like are provided. In the cross-sectional views of the discharge passage 5 side shown in FIGS. 6 to 8, 10 to 13, and the like, the first gas flows in the direction in which the first gas is discharged from the plurality of auxiliary passages A11 to the second penetrated portion 51 and the like via the confluence portion A13. On the other hand, in the cross-sectional views of the supply passage 4 side shown in FIGS. 14 to 20 and the like, the first gas flows in the direction in which the first gas is supplied from the distribution portion A12 to the plurality of auxiliary passages A11 via the first penetrated portion 41 and the like.

Figure 22:
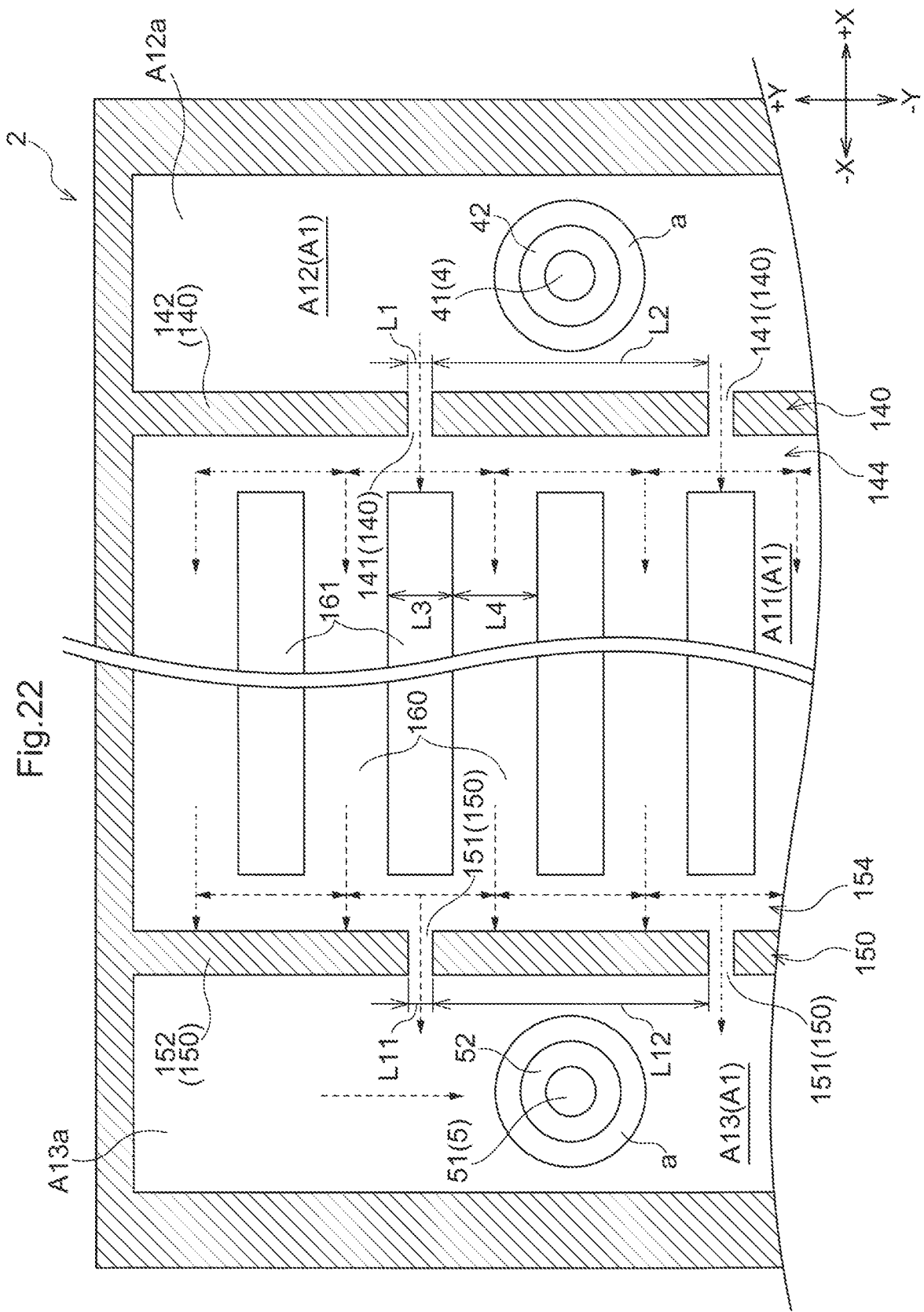
FIG. 22 is an explanatory diagram of a supply structure and a discharge structure.

The distribution portion A12 is provided corresponding to each electrochemical element A. The distribution portion A12 is provided on the supply passage 4 side and serves as a buffer portion for supplying the first gas to each electrochemical element A. The distribution portion A12 is provided on the upstream side of the plurality of auxiliary passages A11 in the internal passage A1 in the direction in which the first gas flows (in the direction from the +X side toward the −X side). As shown in FIGS. 5, 22, and the like, the distribution portion A12 is provided with the first penetrated portion 41 that passes through the second plate-like body 2 at the substantially central portion in the direction intersecting the flowing direction (+Y direction and −Y direction (Y direction)) and in the flowing direction (+X direction and −X direction (X direction)). The first gas flows in the first gas supply portion 61, the first annular sealing portion 42, the first penetrated portion 41, and the like and is supplied to the distribution portion A12 of each electrochemical element A.

As shown in FIGS. 6 to 20 and the like, the first plate-like body 1 and the second plate-like body 2 are integrated by welding the edge portion at the peripheral portion 1a of the first plate-like body 1 and the edge portion at the peripheral portion 1a of the second plate-like body 2 to each other. The distribution portion A12 is formed by processing the second plate-like body 2 such that a portion thereof is recessed downward in the stacking direction (−Z direction) with respect to the peripheral portion 1a. More specifically, the distribution portion A12 is formed such that the location in the stacking direction changes at supply preventing portions 142 (portions of the supply structure 140).

Figure 17:
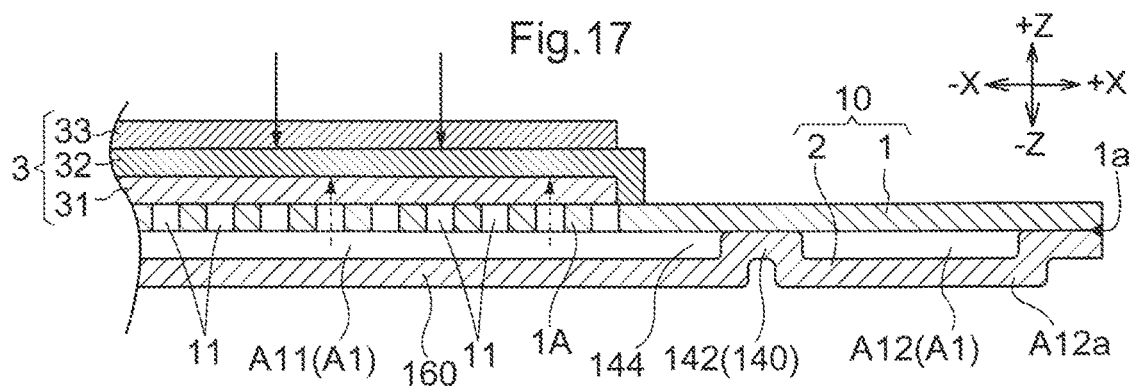
FIG. 17 is a cross-sectional view taken along line XVII-XVII in FIG. 5.
Figure 18:
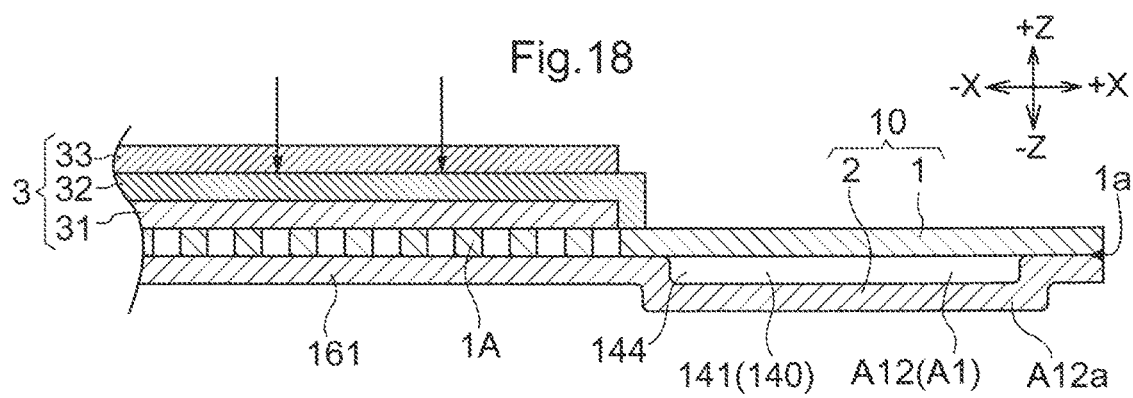
FIG. 18 is a cross-sectional view taken along line XVIII-XVIII in FIG. 5.
Figure 19:
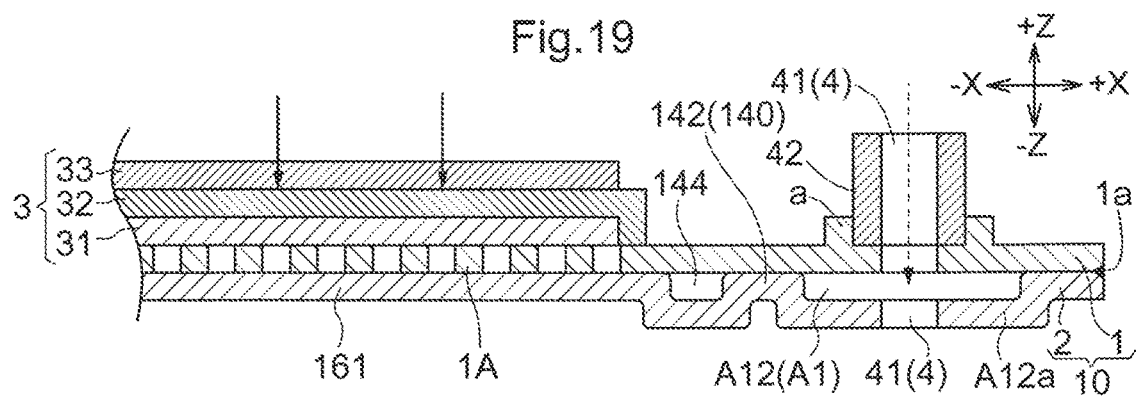
FIG. 19 is a cross-sectional view taken along line XIX-XIX in FIG. 5.
Figure 20:
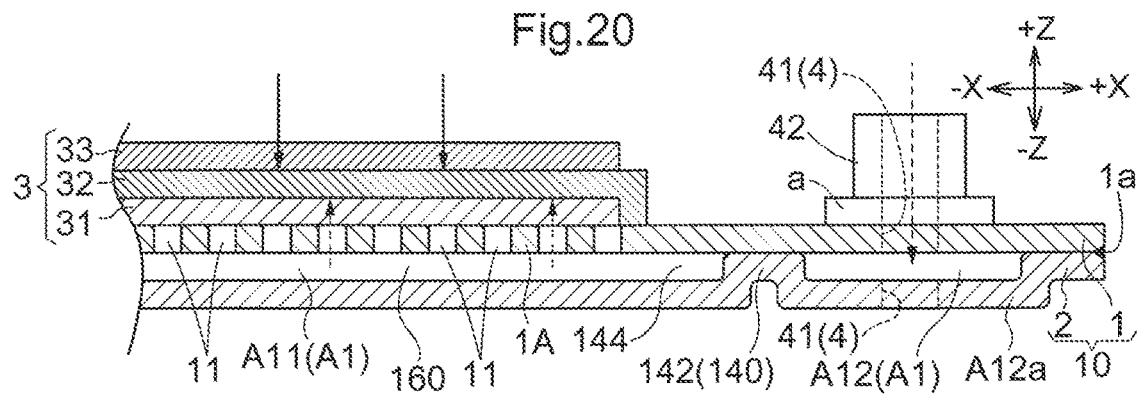
FIG. 20 is a cross-sectional view taken along line XX-XX in FIG. 5.

That is, as shown in FIG. 17 and the like, the top face of the distribution portion A12 is located below the top faces of the supply preventing portions 142 in the stacking direction. The top faces of the supply preventing portions 142 are in contact with the bottom face of the first plate-like body 1. Accordingly, discharge, from the distribution portion A12, of the first gas introduced into the distribution portion A12 is limited due to the supply preventing portions 142 protruding upward in the stacking direction, and the first gas is temporarily stored in the distribution portion A12 formed in a recessed shape.

As shown in FIG. 5 and the like, the distribution portion A12 is elongated in the +Y direction and −Y direction (Y direction) as viewed from above. The length in the Y direction of the distribution portion A12 corresponds to the length in the Y direction of the region provided with the plurality of auxiliary passages A11 that are arranged in parallel at intervals in the Y direction.

As shown in FIGS. 5 to 22 and the like, the plurality of auxiliary passages A11 in which the first gas flows extend in the flowing direction, namely the +X direction and −X direction (X direction). As described above, the plurality of auxiliary passages A11 are arranged in parallel at intervals in the Y direction. As shown in FIGS. 5 to 22 and the like, the second plate-like body 2 includes a plurality of auxiliary passage forming portions 160 for forming the plurality of auxiliary passages A11, and a plurality of partitioning portions 161 that are each provided between the adjacent auxiliary passage forming portions 160 to separate the adjacent auxiliary passages A11. As shown in FIG. 21 and the like, the auxiliary passage forming portions 160 are formed in a recessed shape with a bottom face, and the top faces of the partitioning portions 161 are located above the bottom faces of the auxiliary passage forming portions 160 in the stacking direction. The top faces of the partitioning portions 161 are in contact with the bottom face of the first plate-like body 1. Accordingly, the auxiliary passages A11 are separate from one another, and the first gas flows in each of the auxiliary passages A11 in the flowing direction.

It should be noted that, in FIG. 5 and the like, the auxiliary passages A11 extend in the flowing direction from the vicinity of the supply structure 140 to the vicinity of the discharge structure 150. However, there is no limitation to this configuration, and the auxiliary passages A11 may also be formed in only a portion of the region between the vicinity of the supply structure 140 and the vicinity of the discharge structure 150. That is, the auxiliary passage forming portions 160 for forming the auxiliary passages A11 may also be arranged in only a portion of the region between the vicinity of the supply structure 140 and the vicinity of the discharge structure 150.

As shown in FIGS. 21 and 22, in the +Y direction and −Y direction (Y direction; the intersection direction intersecting the flowing direction), the length L3 of each partitioning portion 161 is smaller than the length L4 of each auxiliary passage forming portion 160 (L3<L4). When L3 is smaller than L4, as shown in FIG. 21 and the like, the contact area between the top face of the partitioning portion 161 and the bottom face of the first plate-like body 1 can be reduced. That is, a space in the auxiliary passage A11 facing the first plate-like body 1 provided with the gas-permeable portion 1A can be increased, thus making it possible to increase the amount of the first gas flowing from the auxiliary passage A11 to the electrochemical reaction portion 3.

As shown in FIGS. 5, 14 to 22, and the like, the second plate-like body 2 includes the supply structure 140 between the distribution portion A12 and the plurality of auxiliary passages A11 in a direction extending in the flowing direction (+X direction and −X direction (X direction)). Due to the supply structure 140, the first gas is temporarily stored in the distribution portion A12, and supply of the first gas from the distribution portion A12 to the plurality of auxiliary passages A11 is limited.

Figure 16:
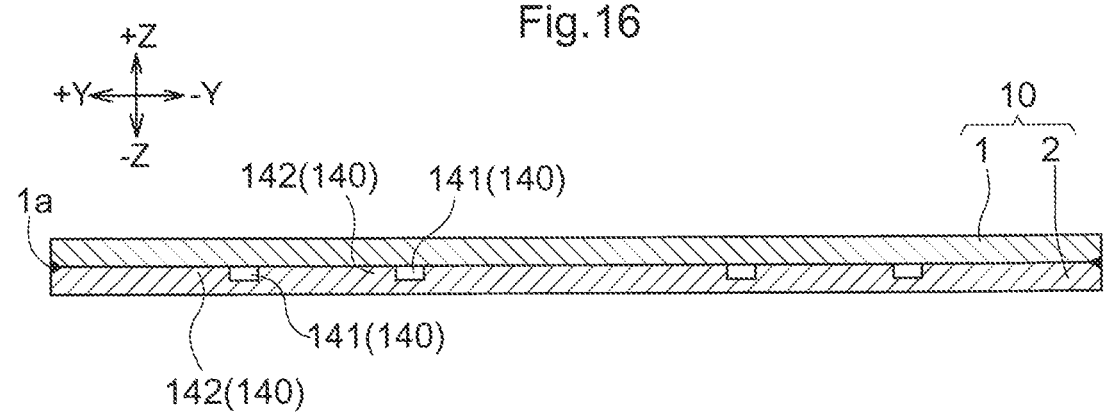
FIG. 16 is a cross-sectional view taken along line XVI-XVI in FIG. 5.

The supply structure 140 includes a plurality of supply passing portions 141 and a plurality of supply preventing portions 142. The first gas flows from the distribution portion A12 to the plurality of auxiliary passages A11 through the supply passing portions 141. The supply preventing portions 142 prevent the first gas from flowing from the distribution portion A12 to the plurality of auxiliary passages A11. As shown in FIG. 16 and the like, the top faces of the supply preventing portions 142 are located above the top faces of the supply passing portions 141 in the stacking direction, and are in contact with the bottom face of the first plate-like body 1. Accordingly, while the supply preventing portions 142 prevent the first gas in the distribution portion A12 from flowing in the flowing direction, the first gas flows to the plurality of auxiliary passages A11 through the supply passing portions 141 in the flowing direction.

In this embodiment, as shown in, for example, FIGS. 5, 22, and the like, the supply preventing portions 142 are formed in a substantially rectangular shape. The rectangular supply preventing portions 142 are arranged in the +Y direction and −Y direction (Y direction) such that the long sides extend in the Y direction. The supply passing portions 141 are each provided between the adjacent supply preventing portions 142. That is, the supply passing portions 141 are each provided in the interval between the short sides of the adjacent supply preventing portions 142 that are opposed to each other.

As shown in FIG. 22, in the +Y direction and −Y direction (Y direction; the intersection direction intersecting the flowing direction), the length L2 of each supply preventing portion 142 is larger than the length L1 of each supply passing portion 141 (L2>L1). It is preferable that the length L1 of each supply passing portion 141 is smaller than the length L3 of each partitioning portion 161 (L1<L3). This configuration allows the first gas ejected from the distribution portion A12 through the supply passing portions 141 to collide against the end portions on the +X side of the partitioning portions 161 and to be temporarily stored in the supply buffer portion 144, which will be described later.

The relationship between L1 and L2 is determined depending on, for example, the amount of the first gas supplied to the distribution portion A12 per unit time, the amount of the first gas to be supplied to the plurality of auxiliary passages A11 per unit time, the number of the supply preventing portions 142, the length L3 in the Y direction of each partitioning portion 161, the length L4 in the Y direction of each auxiliary passage A11, and the like.

As described above, the auxiliary passages A11 are separated by the partitioning portions 161. The plurality of partitioning portions 161 are arranged such that any of the partitioning portions 161 corresponds to one supply passing portion 141 in the flowing direction (+X direction and −X direction (X direction)).

Moreover, the plurality of auxiliary passages A11 are arranged such that at least one of the auxiliary passages A11 corresponds to one supply preventing portion 142 in the flowing direction.

The first gas is introduced into the plurality of auxiliary passages A11 from the distribution portion A12 through the supply passing portions 141. With the above-mentioned configuration, any of the partitioning portions 161 corresponds to one supply passing portion 141 in the flowing direction, the first gas ejected from the distribution portion A12 into the supply passing portions 141 flows in the flowing direction and thus collides against the partitioning portions 161 protruding upward in the stacking direction. Due to the collision with the partitioning portions 161, the first gas flows in the intersection direction intersecting the flowing direction. That is, the first gas flowing from the distribution portion A12 through the supply passing portions 141 is not immediately introduced into the plurality of auxiliary passages A11, but collides against the partitioning portions 161 on the upstream side of the auxiliary passages A11 and flows in the intersection direction. Furthermore, the first gas flowing in the intersection direction does not return to the distribution portion A12 due to the supply preventing portions 142 protruding upward in the stacking direction, and is temporarily stored between the supply structure 140 and the plurality of auxiliary passages A11. Thereafter, the first gas flows along the ejection from the distribution portion A12 and is introduced into the plurality of auxiliary passages A11 formed by the plurality of auxiliary passage forming portions 160.

It should be noted that the region between the supply structure 140 and the plurality of auxiliary passages A11 in which the first gas is temporarily stored is the supply buffer portion 144.

In this embodiment, one of the partitioning portions 161 corresponds to one supply passing portion 141 in the flowing direction. However, there is no limitation to this configuration, and a plurality of partitioning portions 161 may correspond to one supply passing portion 141. A configuration may also be employed in which no partitioning portion 161 corresponds to one supply passing portion 141, and one partitioning portion 161 corresponds to another supply passing portion 141.

The supply preventing portion 142 is provided corresponding to the first penetrated portion 41 in the flowing direction. This makes it possible to reduce a possibility that the first gas flows to the plurality of auxiliary passages A11 immediately after being introduced into the distribution portion A12 from the first penetrated portion 41. Accordingly, the first gas can be temporarily stored in the distribution portion A12.

The number of the supply preventing portions 142 is, for example, two or more, but is not limited thereto. It is preferable to set the number of the supply preventing portions 142 in accordance with the number of the plurality of auxiliary passages A11.

In the description above, the supply preventing portions 142 are lined up in a row in the direction intersecting the flowing direction.

However, there is no limitation to this arrangement as long as the first gas can be temporarily stored in the distribution portion A12, and the first gas can be substantially uniformly supplied to the plurality of auxiliary passages A11. For example, a plurality of supply preventing portions 142 may deviate from the intersection direction. A plurality of supply preventing portions 142 may be arranged in the intersection direction or deviate from the intersection direction.

In the description above, the supply preventing portions 142 have a rectangular shape. However, the shape of the supply preventing portions 142 is not limited thereto as long as gas can be uniformly supplied from the distribution portion A12 to the plurality of auxiliary passages A11. For example, the supply preventing portions 142 may also be formed in various shapes such as a square shape, a circular shape, an elliptical shape, and a triangular shape.

It is preferable that, as in the case of the above-mentioned embodiment shown in FIGS. 5, 22, and the like, two of the plurality of supply preventing portions 142 are respectively provided at a position corresponding to the end portion on the +Y side of the distribution portion A12 and a position corresponding to the end portion on the −Y side thereof, but there is no limitation to this configuration. The first gas is distributed over the distribution portion A12 from the first penetrated portion 41 in the distribution portion A12 so as to spread in the space in the distribution portion A12, and collides against the end faces of the distribution portion A12. Accordingly, the first gas that has collided against the end faces of the distribution portion A12 may change its direction at the end faces and flow toward the plurality of auxiliary passages A11. Therefore, providing the supply preventing portions 142 at positions corresponding to the end portions of the distribution portion A12 makes it possible to reduce a possibility that the first gas immediately flows out of the distribution portion A12 into the plurality of auxiliary passages A11. This makes it possible to substantially uniformly supply the first gas from the distribution portion A12 to the auxiliary passages A11 as described later.

Next, the confluence portion A13 and the discharge structure 150 will be described. The confluence portion A13 and the discharge structure 150 respectively have the same structures as those of the distribution portion A12 and the supply structure 140.

The confluence portion A13 is provided on the discharge passage 5 side and serves as a buffer portion for discharging the first gas flowing in the plurality of auxiliary passages A11. The confluence portion A13 is provided on the downstream side of the plurality of auxiliary passages A11 in the internal passage A1 in the direction in which the first gas flows. As shown in FIGS. 5, 22, and the like, the confluence portion A13 is provided with the second penetrated portion 51 that passes through the second plate-like body 2 at the substantially central portion in the flowing direction and the direction intersecting the flowing direction. The first gas that has passed through the plurality of auxiliary passages A11 is introduced into the confluence portion A13, and is discharged to the outside via the second penetrated portion 51, the second annular sealing portion 52, the first gas discharge portion 62, and the like.

Figure 10:
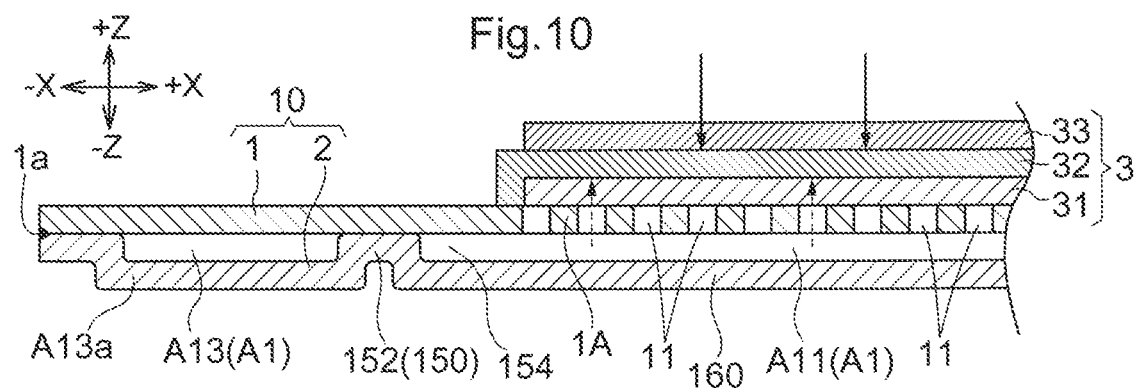
FIG. 10 is a cross-sectional view taken along line X-X in FIG. 5.
Figure 11:
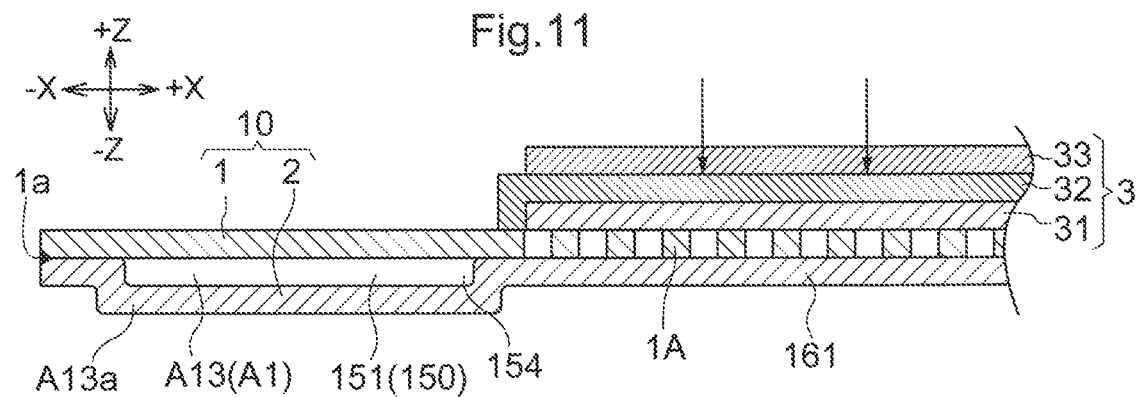
FIG. 11 is a cross-sectional view taken along line XI-XI in FIG. 5.
Figure 12:
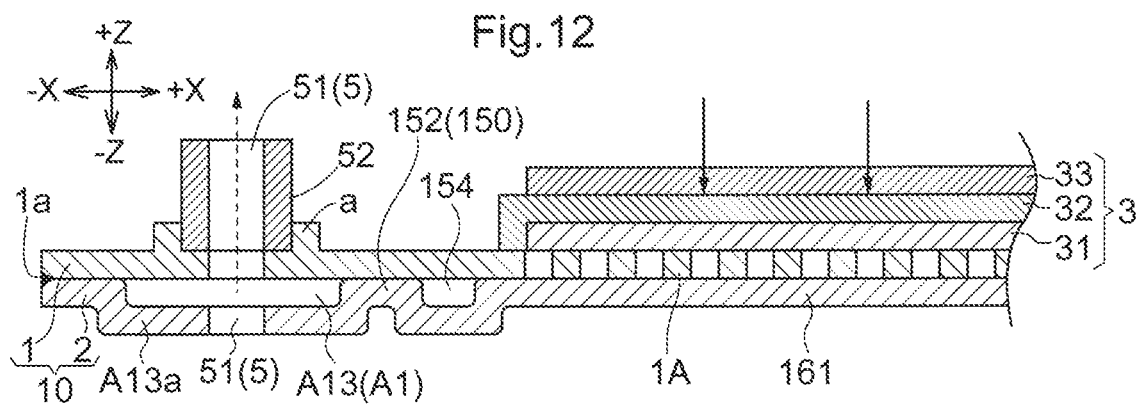
FIG. 12 is a cross-sectional view taken along line XII-XII in FIG. 5.
Figure 13:
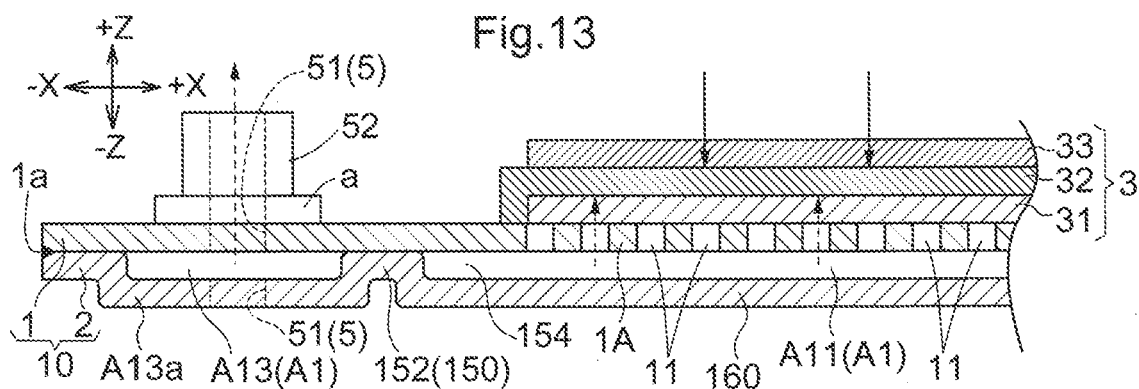
FIG. 13 is a cross-sectional view taken along line XIII-XIII in FIG. 5.
Figure 14:
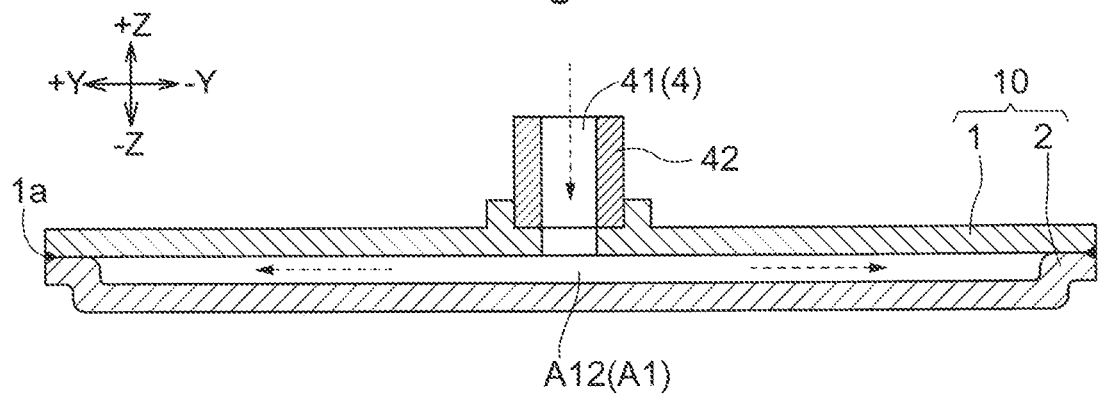
FIG. 14 is a cross-sectional view taken along line XIV-XIV in FIG. 5.
Figure 15:
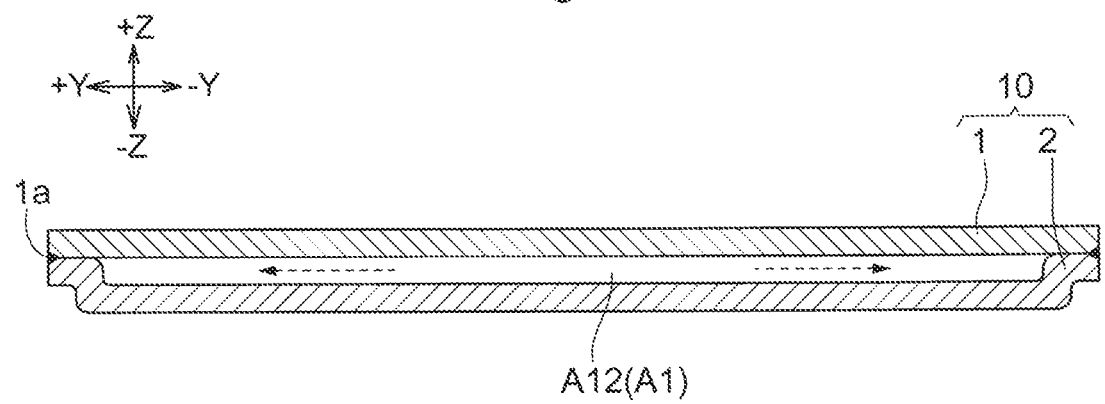
FIG. 15 is a cross-sectional view taken along line XV-XV in FIG. 5.

The confluence portion A13 is formed such that the location in the stacking direction changes at discharge preventing portions 152 (portions of the discharge structure 150). That is, as shown in FIG. 10 and the like, the top face of the confluence portion A13 is located below the top faces of the discharge preventing portions 152 in the stacking direction. The top faces of the discharge preventing portions 152 are in contact with the bottom face of the first plate-like body 1. Accordingly, discharge of the first gas flowing from the plurality of auxiliary passages A11 to the confluence portion A13 is limited due to the discharge preventing portions 152 protruding upward in the stacking direction, and the first gas is temporarily stored in the plurality of auxiliary passages A11.

As shown in FIG. 5 and the like, the confluence portion A13 is elongated in the +Y direction and −Y direction (Y direction) as viewed from above. The length in the Y direction of the confluence portion A13 corresponds to the length in the Y direction of the region provided with the plurality of auxiliary passages A11 that are arranged in parallel at intervals in the Y direction.

As shown in FIGS. 5, 9 to 13, 22, and the like, the second plate-like body 2 includes the discharge structure 150 between the plurality of auxiliary passages A11 and the confluence portion A13 in a direction extending in the flowing direction (+X direction and −X direction (X direction)). Due to the discharge structure 150, discharge of the first gas from the plurality of auxiliary passages A11 to the confluence portion A13 is limited.

The discharge structure 150 includes a plurality of discharge passing portions 151 and a plurality of discharge preventing portions 152. The first gas flows from the plurality of auxiliary passages A11 to the confluence portion A13 through the discharge passing portions 151. The discharge preventing portions 152 prevent the first gas from flowing from the plurality of auxiliary passages A11 to the confluence portion A13. As shown in FIG. 10 and the like, the top faces of the discharge preventing portions 152 are located above the top faces of the discharge passing portions 151 in the stacking direction, and are in contact with the bottom face of the first plate-like body 1. Accordingly, while the discharge preventing portions 152 prevent the first gas in the plurality of auxiliary passages A11 from flowing in the flowing direction, the first gas flows to the confluence portion A13 through the discharge passing portions 151 in the flowing direction.

In this embodiment, as shown in FIGS. 5, 22, and the like, the discharge preventing portions 152 are formed in a substantially rectangular shape as in the case of the supply preventing portions 142. The rectangular discharge preventing portions 152 are arranged in the +Y direction and −Y direction (Y direction) such that the long sides extend in the Y direction. The discharge passing portions 151 are each provided between the adjacent discharge preventing portions 152. That is, the discharge passing portions 151 are each provided in the interval between the short sides of the adjacent discharge preventing portions 152 that are opposed to each other.

As shown in FIG. 22, in the +Y direction and −Y direction (Y direction; the intersection direction intersecting the flowing direction), the length L12 of each discharge preventing portion 152 is larger than the length L11 of each discharge passing portion 151 (L12>L11). It is preferable that the length L12 of each discharge preventing portion 152 is larger than the length L4 of each auxiliary passage forming portion 160 (L12>L4). This configuration allows the first gas flowing from the plurality of auxiliary passages A11 to the confluence portion A13 to collide against the discharge preventing portions 152 and to be temporarily stored in the discharge buffer portion 154, which will be described later.

The relationship between L11 and L12 is determined depending on, for example, the amount of the first gas supplied to the plurality of auxiliary passages A11 per unit time, the amount of the first gas to be discharged from the confluence portion A13 per unit time, the number of the discharge preventing portions 152, the length L3 in the Y direction of each partitioning portion 161, the length L4 in the Y direction of each auxiliary passage A11, and the like.

In the flowing direction, the plurality of auxiliary passages A11 are arranged such that at least one of the auxiliary passages A11 corresponds to one discharge preventing portion 152.

Moreover, the plurality of partitioning portions 161 are arranged such that any of the partitioning portions 161 corresponds to one discharge passing portion 151 in the flowing direction.

With the above-mentioned configuration, the first gas ejected from the plurality of auxiliary passages A11 flows in the flowing direction and thus collides against the discharge preventing portions 152 protruding upward in the stacking direction. Due to the collision with the discharge preventing portions 152, the first gas flows in the intersection direction intersecting the flowing direction. That is, the first gas flowing from the plurality of auxiliary passages A11 is not immediately introduced into the confluence portion A13, but collides against the discharge preventing portions 152 on the upstream side of the confluence portion A13 and flows in the intersection direction. Thereafter, the first gas flows along the ejection from the plurality of auxiliary passages A11, passes through the discharge passing portions 151, and is introduced into the confluence portion A13.

It should be noted that the region between the plurality of auxiliary passages A11 and the discharge structure 150 in which the first gas is temporarily stored is the discharge buffer portion 154.

The discharge preventing portion 152 is provided corresponding to the second penetrated portion 51 in the flowing direction. This makes it possible to reduce a possibility that the first gas flowing in the plurality of auxiliary passages A11 is immediately introduced into the confluence portion A13 and is discharged from the second penetrated portion 51. Accordingly, the first gas can be temporarily stored in the plurality of auxiliary passages A11.

The shapes, sizes, arrangements, numbers, and the like of the discharge passing portions 151 and the discharge preventing portions 152 are the same as those of the supply passing portions 141 and the supply preventing portions 142. For example, in FIG. 22, in the +Y direction and −Y direction (Y direction; the intersection direction intersecting the flowing direction), the length L12 of each discharge preventing portion 152 and the length L11 of each discharge passing portion 151 are respectively the same as the length L2 of each supply preventing portion 142 and the length L1 of each supply passing portion 141, which are described hereinbefore.

However, the shapes, sizes, arrangements, numbers, and the like of the discharge passing portions 151 and the discharge preventing portions 152 may be different from those of the supply passing portions 141 and the supply preventing portions 142. For example, the discharge passing portions 151 may be larger in size than the supply passing portions 141. Due to this configuration, the discharge pressure applied during discharge of the first gas from the plurality of auxiliary passages A11 to the confluence A13 may be smaller than the supply pressure during supply of the first gas from the distribution portion A12 to the plurality of auxiliary passages A11. The first gas is supplied from the distribution portion A12 to the plurality of auxiliary passages A11 with a certain level of supply pressure to make the flow distribution constant among the plurality of auxiliary passages A11, and the first gas can be smoothly introduced into the confluence portion A13 when discharged.

(b) Functions of Supply Structure and Discharge Structure
(b1) Functions of Supply Structure Next, the functions of the supply structure 140 will be described.

The supply preventing portions 142 of the supply structure 140 having the above-mentioned configuration are provided between the distribution portion A12 and the plurality of auxiliary passages A11, and serve as barriers for flow of the first gas from the distribution portion A12 to the plurality of auxiliary passages A11. Accordingly, pressure loss of the first gas increases when the first gas flows from the distribution portion A12 into the plurality of auxiliary passages A11, and the first gas introduced into the distribution portion A12 is distributed over the distribution portion A12 so as to fill the distribution portion A12, and is thus temporarily stored therein. Accordingly, the overall pressure in the distribution portion A12 is substantially uniform (equal pressure). That is, differences in pressure between the distribution portion A12 and the plurality of auxiliary passages A11 are substantially the same. Then, the first gas is supplied from the distribution portion A12 to the plurality of auxiliary passages A11 through the supply passing portions 141, and therefore, the first gas is supplied to the auxiliary passages A11 with substantially equal pressure. Accordingly, the flow distribution (including the flow rate, the flow amount, the pressure, and the like) of the first gas in the flow direction is substantially uniform among the auxiliary passages A11.

Flow of the first gas from the distribution portion A12 is divided and introduced into the plurality of auxiliary passages A11. The flow distribution (including the flow rate, the flow amount, the pressure, and the like) of the first gas is also made substantially equal by a flow straightening effect due to the first gas flowing separately in a plurality of passages compared with the case where the first gas flows in an internal passage that is not provided with a plurality of passages.

As described above, the flow distribution of the first gas in the flowing direction is substantially uniform among the auxiliary passages A11. For example, when the auxiliary passages A11 are viewed at one position in the flowing direction, the flow rate, the flow amount, the pressure, and the like of the first gas are substantially constant among the auxiliary passages A11 in the intersection direction intersecting that position. Accordingly, in the electrochemical reaction portion 3, a difference between a portion that is deficient in the first gas and a portion in which an excessive amount of the first gas flows can be reduced to improve the usage rate of the first gas in the overall electrochemical element A and thus improve the reaction efficiency of an electrochemical reaction.

It should be noted that, if the above-mentioned configuration including the distribution portion A12, the plurality of auxiliary passages A11, the supply structure 140, and the like is not employed, the flow distribution of the first gas may differ between the auxiliary passages A11. That is, the flow rate of the first gas may be fast in a certain auxiliary passage A11, and the flow rate of the first gas may be slow in another auxiliary passage A11. In an auxiliary passage A11 in which the flow rate of the first gas is slow, the first gas is consumed in an electrochemical reaction and becomes insufficient. Accordingly, the concentration of the first gas decreases, and thus there is a risk that the electrode layer of the electrochemical reaction portion 3 is deteriorated due to oxidation, and the electrode performance and the mechanical strength are thus impaired. On the other hand, in an auxiliary passage A11 in which the flow rate of the first gas is fast, the first gas is discharged before consumed in an electrochemical reaction. That is, in the case where the first gas is fuel gas such as hydrogen, the fuel usage rate decreases because high-concentration first gas is discharged. To address the shortage of the first gas in an auxiliary passage A11 in which the flow rate of the first gas is slow, it is conceivable that the supply amount of the first gas supplied to each auxiliary passage A11 is increased. However, in this case, the amount of the first gas discharged before consumed in an electrochemical reaction is further increased in an auxiliary passage A11 in which the flow rate of the first gas is fast, and thus the fuel usage rate further decreases. Accordingly, when the flow distribution of the first gas varies among the auxiliary passages A11, the reaction efficiency of an electrochemical reaction decreases, and thus the power generation efficiency decreases.

(b2) Functions of Discharge Structure

Next, the functions of the discharge structure 150 will be described.

With the above-mentioned configuration, the supply structure 140 for supplying the first gas from the distribution portion A12 to the plurality of auxiliary passages A11 with substantially uniform flow distribution is provided, and in addition, the discharge structure 150 is provided at a position where the first gas enters the confluence portion A13 from the plurality of auxiliary passages A11. The plurality of auxiliary passages A11 are located between the supply structure 140 and the discharge structure 150, thus making it possible to make the flow distribution (including the flow rate, the flow amount, the pressure, and the like) of the first gas substantially uniform among the plurality of auxiliary passages A11 and to improve the reaction efficiency of an electrochemical reaction.

The following is a more specific description. The discharge preventing portions 152 of the discharge structure 150 having the above-mentioned configuration are provided between the plurality of auxiliary passages A11 and the confluence portion A13, and serve as barriers for flow of the first gas from the auxiliary passages A11 to the confluence portion A13. Accordingly, pressure loss of the first gas increases when the first gas flows from the plurality of auxiliary passages A11 into the confluence portion A13. Therefore, the first gas introduced into the plurality of auxiliary passages A11 is less likely to be immediately introduced into the confluence portion A13 from the plurality of auxiliary passages A11, and is distributed over the plurality of auxiliary passages A11 so as to fill the auxiliary passages A11. This makes it possible to make the flow distribution (including the flow rate, the flow amount, the pressure, and the like) of the first gas in the flowing direction substantially uniform among the plurality of auxiliary passages A11. Moreover, the first gas is distributed over the plurality of auxiliary passages A11 so as to fill the auxiliary passages A11, and therefore, an electrochemical reaction sufficiently occurs in the plurality of auxiliary passages A11. Accordingly, the reaction efficiency of the electrochemical reaction can be improved.

Electrochemical Reaction Portion

Electrode Layer

As shown in FIGS. 9 to 13, 17 to 20, and the like, the electrode layer 31 can be provided as a thin layer in a region that is larger than the region provided with the through holes 11, on the front face of the first plate-like body 1. When it is formed as a thin layer, the thickness can be set to, for example, approximately 1 μm to 100 μm, and preferably approximately 5 μm to 50 μm. This thickness makes it possible to ensure sufficient electrode performance while also achieving cost reduction by reducing the used amount of expensive electrode layer material.

The region provided with the through holes 11 is entirely covered by the electrode layer 31. That is, the through holes 11 are formed inside the region of the first plate-like body 1 in which the electrode layer 31 is formed. In other words, all the through holes 11 are provided facing the electrode layer 31.

The inside and the surface of the electrode layer 31 are provided with a plurality of pores in order to impart gas permeability to the electrode layer 31.

That is, the electrode layer 31 is formed as a porous layer. The electrode layer 31 is formed, for example, to have a denseness of 30% or more and less than 80%. Regarding the size of the pores, a size suitable for smooth progress of an electrochemical reaction can be selected as appropriate. It should be noted that the "denseness" is a ratio of the material of the layer to the space and can be represented by a formula "1-porosity", and is equivalent to relative density.

For example, a composite material such as NiO-GDC, Ni-GDC, NiO—YSZ, Ni—YSZ, CuO—CeO$_2$, or Cu—CeO$_2$ can be used as the material of the electrode layer 31. In these examples, GDC, YSZ, and CeO$_2$ can be called the aggregate of the composite material. It should be noted that it is preferable to form the electrode layer 31 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 31 is obtained, for example, without using calcining in a high temperature range of higher than 1100° C. Therefore, this is preferable due to being able to prevent damage to the first plate-like body 1, suppress element interdiffusion between the first plate-like body 1 and the electrode layer 31, and realize an electrochemical element A that has excellent durability. Furthermore, using low-temperature calcining makes it possible to facilitate handling of raw materials and is thus more preferable.

Intermediate Layer

An intermediate layer 34 can be formed as a thin layer on the electrode layer 31 so as to cover the electrode layer 31. When it is formed as a thin layer, the thickness can be set to, for example, approximately 1 μm to 100 μm, preferably approximately 2 μm to 50 μm, and more preferably approximately 4 μm to 25 μm. This thickness makes it possible to ensure sufficient performance while also achieving cost reduction by reducing the used amount of expensive material of the intermediate layer 34. YSZ (yttria-stabilized zirconia), SSZ (scandia-stabilized zirconia), GDC (gadolinium-doped ceria), YDC (yttrium-doped ceria), SDC (samarium-doped ceria), or the like can be used as the material of the intermediate layer 34. In particular, ceria-based ceramics are favorably used.

It is preferable to form the intermediate layer 34 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, a favorable intermediate layer 34 is obtained, for example, without using calcining in a high temperature range of higher than 1100° C. Therefore, it is possible to prevent damage to the first plate-like body 1, suppress element interdiffusion between the first plate-like body 1 and the electrode layer 31, and realize an electrochemical element A that has excellent durability. Furthermore, using low-temperature calcining makes it possible to facilitate handling of raw materials and is thus more preferable.

It is preferable that the intermediate layer 34 has oxygen ion (oxide ion) conductivity. It is more preferable that the intermediate layer 34 has both oxygen ion (oxide ion) conductivity and electron conductivity, namely mixed conductivity. The intermediate layer 34 that has these properties is suitable for application to the electrochemical element A.

Electrolyte Layer

As shown in FIGS. 9 to 13, 17 to 20, and the like, the electrolyte layer 32 is formed as a thin layer on the intermediate layer 34 so as to cover the electrode layer 31 and the intermediate layer 34. The electrolyte layer 32 can also be formed as a thin layer having a thickness of 10 μm or less. Specifically, the electrolyte layer 32 is provided on both the intermediate layer 34 and the first plate-like body 1 (spanning the intermediate layer 34 and the first plate-like body 1). Configuring the electrolyte layer 32 in this manner and joining the electrolyte layer 32 to the first plate-like body 1 make it possible to allow the electrochemical element to have excellent toughness as a whole.

Also, as shown in FIG. 9 and the like, the electrolyte layer 32 is provided in a region that is larger than the region provided with the through holes 11, on the front face of the first plate-like body 1. That is, the through holes 11 are formed inside the region of the first plate-like body 1 in which the electrolyte layer 32 is formed.

The leakage of gas from the electrode layer 31 and the above-mentioned intermediate layer (not shown) can be suppressed in the vicinity of the electrolyte layer 32. A description of this will be given. When the electrochemical element A is used as a constituent element of a SOFC, gas is supplied from the back side of the first plate-like body 1 through the through holes 11 to the electrode layer 31 during the operation of the SOFC. In a region where the electrolyte layer 32 is in contact with the first plate-like body 1, leakage of gas can be suppressed without providing another member such as a gasket.

It should be noted that although the entire vicinity of the electrode layer 31 is covered by the electrolyte layer 32 in this embodiment, a configuration in which the electrolyte layer 32 is provided on the electrode layer 31 and the above-mentioned intermediate layer 34 and a gasket or the like is provided in its vicinity may also be adopted.

Electrolyte materials having oxygen ion conductivity such as YSZ (yttria-stabilized zirconia), SSZ (scandia-stabilized zirconia), GDC (gadolinium-doped ceria), YDC (yttrium-doped ceria), SDC (samarium-doped ceria), LSGM (strontium- and magnesium-doped lanthanum gallate), and the like, and electrolyte materials having hydrogen ion conductivity such as perovskite oxides can be used as the material of the electrolyte layer 32. In particular, zirconia-based ceramics are favorably used. Using zirconia-based ceramics for the electrolyte layer 32 makes it possible to increase the operation temperature of the SOFC in which the electrochemical element A is used compared with the case where ceria-based ceramics and various materials having hydrogen ion conductivity are used. For example, when the electrochemical element A is used in the SOFC, by adopting a system configuration in which a material such as YSZ that can exhibit high electrolyte performance even in a high temperature range of approximately 650° C. or higher is used as the material of the electrolyte layer 32, a hydrocarbon-based raw fuel such as city gas or LPG is used as the raw fuel for the system, and the raw fuel is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 32 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD (chemical vapor deposition) technique, or the like. Due to these film formation processes that can be used in a low temperature range, an electrolyte layer 32 that is dense and has high gas-tightness and gas barrier properties is obtained, for example, without using calcining in a high temperature range of higher than 1100° C. Therefore, it is possible to prevent damage to the first plate-like body 1, suppress element interdiffusion between the first plate-like body 1 and the electrode layer 31, and realize an electrochemical element A that has excellent performance and durability. In particular, using low-temperature calcining, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 32 is given a dense configuration in order to block gas leakage of anode gas and cathode gas and exhibit high ion conductivity. The electrolyte layer 32 preferably has a denseness of 90% or more, more preferably 95% or more, and even more preferably 98% or more. When the electrolyte layer 32 is formed as a uniform layer, the denseness is preferably 95% or more, and more preferably 98% or more. When the electrolyte layer 32 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer

A reaction preventing layer 35 can be formed as a thin layer on the electrolyte layer 32. When it is formed as a thin layer, the thickness can be set to, for example, approximately 1 μm to 100 μm, preferably approximately 2 μm to 50 μm, and more preferably approximately 3 μm to 15 μm. This thickness makes it possible to ensure sufficient performance while also achieving cost reduction by reducing the used amount of expensive reaction preventing layer material. The material of the reaction preventing layer need only be capable of preventing reactions between the component of the electrolyte layer 32 and the component of the counter electrode layer 33. For example, a ceria-based material or the like is used. Materials that contain at least one element selected from the group consisting of Sm, Gd, and Y are favorably used as the material of the reaction preventing layer 35. It is preferable that at least one element selected from the group consisting of Sm, Gd, and Y is contained, and the total content of these elements is 1.0 mass % or more and 10 mass % or less. Introducing the reaction preventing layer 35 between the electrolyte layer 32 and the counter electrode layer 33 effectively suppresses reactions between the material constituting the counter electrode layer 33 and the material constituting the electrolyte layer 32 and makes it possible to improve long-term stability in the performance of the electrochemical element A. Forming the reaction preventing layer 35 using, as appropriate, a method through which the reaction preventing layer 35 can be formed at a treatment temperature of 1100° C. or lower makes it possible to suppress damage to the first plate-like body 1, suppress element interdiffusion between the first plate-like body 1 and the electrode layer 31, and realize an electrochemical element A that has excellent performance and durability, and is thus preferable. For example, the reaction preventing layer 35 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Counter Electrode Layer

As shown in FIGS. 9 to 13, 17 to 20, and the like, the counter electrode layer 33 can be formed as a thin layer on the electrolyte layer 32 or the reaction preventing layer 35. When it is formed as a thin layer, the thickness can be set to, for example, approximately 1 µm to 100 µm, and preferably approximately 5 µm to 50 µm. This thickness makes it possible to ensure sufficient electrode performance while also achieving cost reduction by reducing the used amount of expensive counter electrode layer material. For example, a complex oxide such as LSCF or LSM, or a ceria-based oxide, or a mixture thereof can be used as the material of the counter electrode layer 33. In particular, it is preferable that the counter electrode layer 33 includes a perovskite oxide containing two or more elements selected from the group consisting of La, Sr, Sm, Mn, Co, and Fe. The counter electrode layer 33 constituted by the above-mentioned material functions as a cathode.

It should be noted that forming the counter electrode layer 33 using, as appropriate, a method through which the counter electrode layer 33 can be formed at a treatment temperature of 1100° C. or lower makes it possible to suppress damage to the first plate-like body 1, suppress element interdiffusion between the first plate-like body 1 and the electrode layer 31, and realize an electrochemical element A that has excellent performance and durability, and is thus preferable. For example, the counter electrode layer 33 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

By configuring the electrochemical reaction portion 3 as described above, the electrochemical element A can be used as a power generating cell for a solid oxide fuel cell when the electrochemical reaction portion 3 is allowed to function as a fuel cell (electrochemical power generating cell). For example, fuel gas containing hydrogen serving as the first gas is supplied from the back face of the first plate-like body 1 through the through holes 11 to the electrode layer 31, air serving as the second gas is supplied to the counter electrode layer 33 serving as a counter electrode of the electrode layer 31, and the temperature is maintained at the operation temperature of, for example, approximately 700° C. Accordingly, the oxygen $O_2$ included in air reacts with electrons $e^-$ in the counter electrode layer 33, thus producing oxygen ions $O^{2-}$. The oxygen ions $O^{2-}$ move to the electrode layer 31 through the electrolyte layer 32. In the electrode layer 31, the hydrogen $H_2$ included in the supplied fuel gas reacts with the oxygen ions $O^{2-}$, thus producing water $H_2O$ and electrons $e^-$.

When the electrolyte layer 32 is made of an electrolyte material having hydrogen ion conductivity, hydrogen $H_2$ included in the fuel gas flowing in the electrode layer 31 releases electrons $e^-$, thus producing hydrogen ions $H^+$. The hydrogen ions $H^+$ move to the counter electrode layer 33 through the electrolyte layer 32. In the counter electrode layer 33, oxygen $O_2$ included in air, hydrogen ions $H^+$, and electrons $e^-$ react with each other to produce water 1120.

With these reactions, electromotive force as electrochemical output is generated between the electrode layer 31 and the counter electrode layer 33. In this case, the electrode layer 31 functions as a fuel electrode (anode) of the fuel cell, and the counter electrode layer 33 functions as an air electrode (cathode).

Although omitted in FIGS. 9 to 13, 17 to 20, and the like, the intermediate layer 34 is provided between the electrode layer 31 and the electrolyte layer 32 of the electrochemical reaction portion 3 of this embodiment as shown in FIG. 21. Furthermore, the reaction preventing layer 35 is provided between the electrolyte layer 32 and the counter electrode layer 33.

Method for Manufacturing Electrochemical Reaction Portion

Next, a method for manufacturing the electrochemical reaction portion 3 will be described. It should be noted that the description will be given mainly with reference to FIG. 21 since the intermediate layer 34 and the reaction preventing layer 35 are omitted in FIGS. 9 to 13, 17 to 20, and the like.

Electrode Layer Forming Step

In an electrode layer forming step, the electrode layer 31 is formed as a thin film in a region that is broader than the region provided with the through holes 11, on the front face of the first plate-like body 1. The through holes 11 of the first plate-like body 1 can be provided through laser processing or the like. As described above, the electrode layer 31 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

The following is a specific example of the case where low-temperature calcining is performed as the electrode layer forming step.

First, a material paste is produced by mixing powder of the material of the electrode layer 31 and a solvent (dispersion medium), and is applied to the front face of the first plate-like body 1. Then, calcining is performed at a temperature of 800° C. to 1100° C.

Diffusion Suppressing Layer Forming Step

The metal oxide layer 12 (diffusion suppressing layer) is formed on the surface of the first plate-like body 1 during the calcining step in the above-described electrode layer forming step. It should be noted that it is preferable that the above-mentioned calcining step includes a calcining step in which the calcining atmosphere satisfies the atmospheric condition that the oxygen partial pressure is low because a high-quality metal oxide layer 12 (diffusion suppressing layer) that has a high element interdiffusion suppressing effect and has a low resistance value is formed. In a case where a coating method that does not include calcining is performed as the electrode layer forming step, for example, a separate diffusion suppressing layer forming step may also be included. In any case, it is desirable to perform these steps at a temperature of 1100° C. or lower so that damage to the first plate-like body 1 can be suppressed.

Intermediate Layer Forming Step

In an intermediate layer forming step, the intermediate layer 34 is formed as a thin layer on the electrode layer 31 so as to cover the electrode layer 31. As described above, the intermediate layer 34 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

The following is a specific example of the case where low-temperature calcining is performed as the intermediate layer forming step.

First, a material paste is produced by mixing powder of the material of the intermediate layer 34 and a solvent (dispersion medium), and is applied to the front face of the first plate-like body 1. Then, the intermediate layer 34 is obtained through compression molding (intermediate layer smoothing step) and calcining at a temperature of 1100° C. or lower (intermediate layer calcining step). Examples of rolling of the intermediate layer 34 include CIP (Cold Isostatic Pressing) molding, roll pressing molding, and RIP (Rubber Isostatic Pressing) molding. It is favorable to perform calcining of the intermediate layer 34 at a temperature of 800° C. or higher and 1100° C. or lower. The reason for this is that this temperature makes it possible to form an intermediate layer 34 that has high strength while suppressing damage to and deterioration of the first plate-like body 1. It is more preferable to perform calcining of the intermediate layer 34 at a temperature of 1050° C. or lower, and more preferably 1000° C. or lower. The reason for this is that the lower the calcining temperature of the intermediate layer 34 is, the more likely it is to further suppress damage to and deterioration of the first plate-like body 1 when forming the electrochemical element A. The order in which the intermediate layer smoothing step and the intermediate layer calcining step are performed can be changed.

It should be noted that lapping molding, leveling treatment, surface cutting treatment, surface polishing treatment, or the like can also be performed as the intermediate layer smoothing step.

Electrolyte Layer Forming Step

In an electrolyte layer forming step, the electrolyte layer 32 is formed as a thin layer on the intermediate layer 34 so as to cover the electrode layer 31 and the intermediate layer 34. The electrolyte layer 32 may also be formed as a thin film having a thickness of 10 μm or less. As described above, the electrolyte layer 32 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

It is desirable to perform a spray coating technique as the electrolyte layer forming step in order to form a high-quality electrolyte layer 32 that is dense and has high gas-tightness and gas barrier properties in a temperature range of 1100° C. or lower. In this case, the material of the electrolyte layer 32 is sprayed onto the intermediate layer 34 on the first plate-like body 1, and the electrolyte layer 32 is thus formed.

Reaction Preventing Layer Forming Step

In a reaction preventing layer forming step, the reaction preventing layer 35 is formed as a thin layer on the electrolyte layer 32. As described above, the reaction preventing layer 35 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1. It should be noted that, for example, leveling treatment, surface cutting treatment, or surface polishing treatment may be performed after the formation of the reaction preventing layer 35, or pressing processing may be performed after wet formation and before calcining, in order to flatten the top face of the reaction preventing layer 35.

Counter Electrode Layer Forming Step

In a counter electrode layer forming step, the counter electrode layer 33 is formed as a thin layer on the reaction preventing layer 35. As described above, the counter electrode layer 33 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

In this manner, the electrochemical reaction portion 3 can be manufactured.

It should be noted that a configuration in which the electrochemical reaction portion 3 does not include both or either of the intermediate layer 34 and the reaction preventing layer 35 is also possible. That is, a configuration in which the electrode layer 31 and the electrolyte layer 32 are in contact with each other, or a configuration in which the electrolyte layer 32 and the counter electrode layer 33 are in contact with each other is also possible. In this case, in the above-described manufacturing method, the intermediate layer forming step and the reaction preventing layer forming step are omitted. It should be noted that it is also possible to add a step of forming another layer or to form a plurality of layers of the same type one on top of another, but in any case, it is desirable to perform these steps at a temperature of 1100° C. or lower.

Electrochemical Element Stack

As shown in FIG. 4, the electrochemical element stack S is formed by stacking a plurality of electrochemical elements A in a predetermined stacking direction. The electrochemical elements A are arranged such that, regarding the adjacent electrochemical elements A, the plate-like support 10 included in one electrochemical element A (first electrochemical element A) is opposed to the plate-like support 10 included in the other electrochemical element A (second electrochemical element A).

For example, one electrochemical element A (first electrochemical element A) includes the plate-like support 10 that includes the first plate-like body 1 and the second plate-like body 2, on which the first plate-like body 1 the electrochemical reaction portion 3 is arranged. Similarly, the second electrochemical elements A adjacent to the first electrochemical element A on the lower side (first side) and the upper side (second side) thereof each include the plate-like support 10 that includes the first plate-like body 1 and the second plate-like body 2, on which the first plate-like body 1 the electrochemical reaction portion 3 is arranged.

The outer face of the second plate-like body 2 of the first electrochemical element A is electrically connected to the outer face of the first plate-like body 1 of a second electrochemical element A adjacent to the first electrochemical element A on the upper side thereof. The flowing portion A2 through which the second gas flows is formed between the outer face of the second plate-like body 2 of the first electrochemical element A and the outer face of the first plate-like body 1 of the second electrochemical element A adjacent to the first electrochemical element A on the upper side thereof, and extends along both of the outer faces.

Moreover, the outer face of the first plate-like body 1 of the first electrochemical element A is electrically connected to the outer face of the second plate-like body 2 of a second electrochemical element A adjacent to the first electrochemical element A on the lower side thereof. As a method for electrically connecting the two outer faces, a method for simply bringing electroconductive surfaces into contact with each other, a method for applying contact pressure to the contact faces, a method for reducing contact resistance by providing a highly electroconductive material therebetween, or the like can be employed. The auxiliary passage A11 (a portion of the internal passage A1) through which the first gas flows is formed between the outer face of the first plate-like body 1 of the first electrochemical element A and the outer face of the second plate-like body 2 of the second electrochemical element A adjacent to the first electrochemical element A on the lower side thereof, and extends along both of the outer faces.

In this manner, the plurality of electrochemical elements A are stacked. Specifically, the rectangular electrochemical elements are lined up and stacked in the state in which the first penetrated portions 41 at one end and the second penetrated portions 51 at the other end are respectively aligned and the electrochemical reaction portions of the electrochemical elements face upward. The first annular sealing portions 42 are interposed between the first penetrated portions 41, and the second annular sealing portions 52 are interposed between the second penetrated portions 51.

The first penetrated portion 41 forming the supply passage 4 for supplying the first gas that is one of reducing component gas and oxidative component gas from the outside in the surface penetration direction to the internal passage A1 is provided at one end in the longitudinal direction of the rectangular plate-like support 10. The first annular sealing portion 42 serving as an annular sealing portion for separating the first penetrated portion 41 formed in each of the two outer faces of the plate-like member 10 from the flowing portion A2 is provided in the flowing portion A2. The supply passage 4 for supplying the first gas to the internal passage A1 is formed by the first penetrated portion 41 and the first annular sealing portion 42. It should be noted that an annular bulging portion a is provided around a portion of the first plate-like body 1 with which the first annular sealing portion 42 is in contact, on a face of the first plate-like body 1 on a side opposite to the internal passage A1, thus making it easy to position the first annular sealing portion 42 in the direction along the face of the first plate-like body 1.

Moreover, the other end side of the plate-like support 10 is provided with the second penetrated portion 51 forming the discharge passage 5 for discharging the first gas that has passed through the internal passage A1 to the outside of the plate-like support 10 in the surface penetration direction. The second penetrated portion 51 has a configuration in which the first gas flows therein in a state of being separated from the second gas. The second annular sealing portion 52 serving as an annular sealing portion for separating the second penetrated portion 51 formed in each of the two outer faces of the plate-like support 10 from the flowing portion A2 is provided in the flowing portion A2. The discharge passage 5 for discharging the first gas flowing in the internal passage A1 is formed by the second penetrated portion 51 and the second annular sealing portion 52.

The first annular sealing portion 42 and the second annular sealing portion 52 are made of an insulation material such as a ceramics material (e.g., alumina), mica, or metal covered by the ceramics material or mica, and function as insulating sealing portions that electrically insulate the adjacent electrical elements from each other.

(6) Energy System, Electrochemical Device

Figure 23:
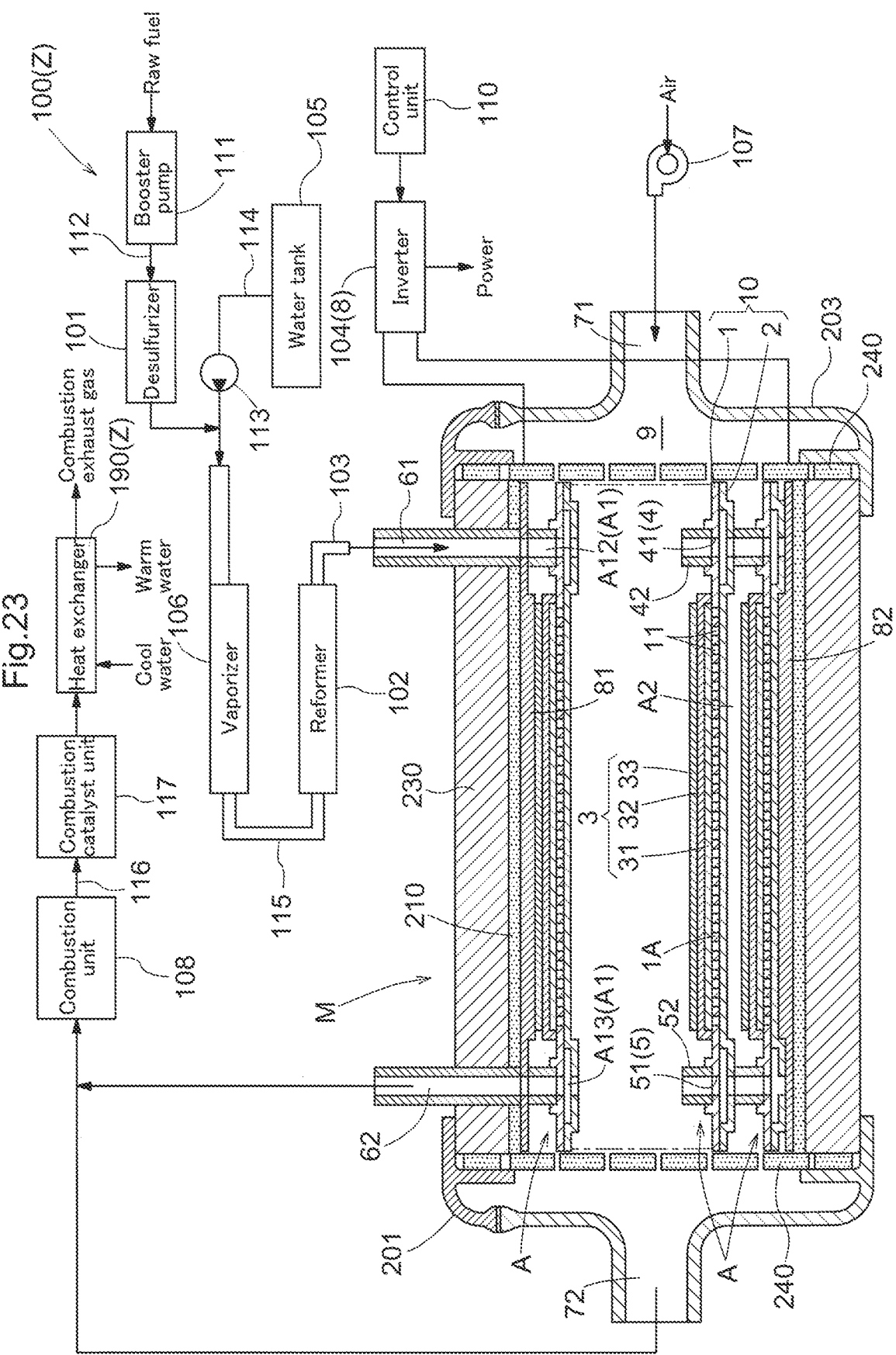
FIG. 23 is a schematic view of an energy system.

Next, an energy system and an electrochemical device will be described with reference to FIG. 23.

An energy system Z includes an electrochemical device 100 and a heat exchanger 190 serving as a waste heat utilization system that reuses heat discharged from the electrochemical device 100.

The electrochemical device 100 includes the electrochemical module M, a fuel supply module, and an inverter (an example of a power converter) 104 serving as the output portion 8 for extracting power from the electrochemical module M. The fuel supply module includes a fuel supply unit 103 that includes a desulfurizer 101, a vaporizer 106, and a reformer 102 and supplies fuel gas containing a reducing component to the electrochemical module M. In this case, the reformer 102 serves as a fuel converter.

Specifically, the electrochemical device 100 includes the desulfurizer 101, a water tank 105, the vaporizer 106, the reformer 102, a blower 107, a combustion unit 108, the inverter 104, a control unit 110, and the electrochemical module M.

The desulfurizer 101 removes sulfur compound components contained in a hydrocarbon-based raw fuel such as city gas (i.e., performs desulfurization). When a sulfur compound is contained in the raw fuel, the inclusion of the desulfurizer 101 makes it possible to suppress an adverse influence that the sulfur compound has on the reformer 102 or the electrochemical elements A. The vaporizer 106 produces water vapor (steam) from water supplied from the water tank 105. The reformer 102 uses the water vapor (steam) produced by the vaporizer 106 to perform steam reforming of the raw fuel desulfurized by the desulfurizer 101, thus producing reformed gas containing hydrogen.

The electrochemical module M generates power by causing an electrochemical reaction to occur with use of the reformed gas supplied from the reformer 102 and air supplied from the blower 107. The combustion unit 108 mixes the reaction exhaust gas discharged from the electrochemical module M with air, and burns combustible components in the reaction exhaust gas.

The inverter 104 adjusts the power output from the electrochemical module M to obtain the same voltage and frequency as power received from a commercial system (not shown). The control unit 110 controls the operation of the electrochemical device 100 and the energy system Z.

The reformer 102 performs a reforming process on the raw fuel with use of combustion heat produced by the combustion of reaction exhaust gas in the combustion unit 108.

The raw fuel is supplied to the desulfurizer 101 via a raw fuel supply passage 112, due to operation of a booster pump 111. The water in the water tank 105 is supplied to the vaporizer 106 via a water supply passage 114, due to operation of a water pump 113. The raw fuel supply passage 112 merges with the water supply passage 114 at a location on the downstream side of the desulfurizer 101, and the water and the raw fuel, which have been merged outside of the container 200, are supplied to the vaporizer 106.

The water is vaporized by the vaporizer 106 to produce water vapor. The raw fuel, which contains the water vapor produced by the vaporizer 106, is supplied to the reformer 102 via a water vapor-containing raw fuel supply passage 115. In the reformer 102, the raw fuel is subjected to steam reforming, thus producing reformed gas that includes hydrogen gas as a main component (first gas including a reducing component). The reformed gas produced in the reformer 102 is supplied to the electrochemical module M via the fuel supply unit 103.

The reaction exhaust gas is burned in the combustion unit 108, and combustion exhaust gas is sent from a combustion exhaust gas discharge passage 116 to the heat exchanger 190. A combustion catalyst unit 117 (e.g., a platinum-based catalyst) is provided in the combustion exhaust gas discharge passage 116, and reducing components such as carbon monoxide and hydrogen contained in the combustion exhaust gas are removed by combustion.

The heat exchanger 190 uses supplied cool water to perform heat exchange on the combustion exhaust gas produced by combustion in the combustion unit 108, thus producing warm water. In other words, the heat exchanger 190 operates as a waste heat utilization system that reuses heat discharged from the electrochemical device 100.

It should be noted that instead of the waste heat utilization system, it is possible to provide a reaction exhaust gas using unit that uses the reaction exhaust gas that is discharged from the electrochemical module M (without being burned). At least a portion of the reaction exhaust gas flowing from the first gas discharge portion 62 to the outside of the container 200 may be returned to one of the members 100, 101, 103, 106, 112, 113, and 115 shown in FIG. 23 and recycled. The reaction exhaust gas contains remaining hydrogen gas that was not used in the reaction in the electrochemical elements A. In the reaction exhaust gas using unit, the remaining hydrogen gas is used to perform heat utilization through combustion or power generation by a fuel cell and so on, thus achieving effective energy utilization.

OTHER EMBODIMENTS

The configuration disclosed in the embodiment described above (including the other embodiments; the same applies to the following) can be applied in combination with configurations disclosed in the other embodiments as long as no contradiction arises. Also, the embodiments disclosed in this specification are illustrative, embodiments of the present invention are not limited to the disclosed embodiments, and appropriate modifications can be made without departing from the object of the present invention.

(1) In the above-mentioned embodiment, the internal passage A1 including the distribution portion A12, the plurality of auxiliary passages A11, the confluence portion A13, the supply buffer portion 144, and the discharge buffer portion 154 is formed by arranging the second plate-like body 2 having an uneven shape and the first plate-like body 1 having a flat shape so as to be opposed to each other in the stacking direction. However, it is sufficient that the internal passage A1 can be formed, and a configuration is also possible in which a first plate-like body 1 having an uneven shape and a second plate-like body 2 having a flat shape are arranged so as to be opposed to each other in the stacking direction. A configuration is also possible in which a first plate-like body 1 of which a portion has an uneven shape and a second plate-like body 2 of which a portion has an uneven shape are arranged so as to be opposed to each other.

(2) In the above-mentioned embodiment, the second plate-like body 2 is provided with the supply structure 140 and the discharge structure 150. However, it is sufficient that the second plate-like body 2 is provided with either the supply structure 140 or the discharge structure 150. For example, a configuration is possible in which the second plate-like body 2 does not include the discharge structure 150 and includes only the supply structure 140. Even in the case where only the supply structure 140 is provided, flow distribution (including the flow rate, the flow amount, the pressure, and the like) in the flow direction of the first gas supplied from the distribution portion A12 to the plurality of auxiliary passages A11 can be made substantially uniform among the auxiliary passages A11.

(3) Although the electrochemical elements A are used in a solid oxide fuel cell serving as the electrochemical device 100 in the above-mentioned embodiment, the electrochemical elements A can also be used in a solid oxide electrolysis cell, an oxygen sensor using a solid oxide, and the like. The electrochemical elements A can also be used alone as well as used in combination of two or more for the electrochemical element stack S or the electrochemical module M.

That is, in the above-mentioned embodiment, a configuration that can improve the efficiency of converting chemical energy such as fuel into electric energy is described.

In other words, in the above-mentioned embodiment, the electrochemical elements A and the electrochemical module M are operated as fuel cells, and hydrogen gas flows to the electrode layer 31 and oxygen gas flows to the counter electrode layer 33. Accordingly, oxygen molecules $O_2$ react with electrons $e^-$ to produce oxygen ions $O^{2-}$ in the counter electrode layer 33. The oxygen ions $O^{2-}$ move to the electrode layer 31 through the electrolyte layer 32. In the electrode layer 31, hydrogen molecules $H_2$ react with oxygen ions $O^{2-}$ to produce water $H_2O$ and electrons $e^-$. With these reactions, electromotive force is generated between the electrode layer 31 and the counter electrode layer 33, and power is generated.

On the other hand, when the electrochemical elements A and the electrochemical module M are operated as electrolysis cells, gas containing water vapor and carbon dioxide flows to the electrode layer 31, and a voltage is applied between the electrode layer 31 and the counter electrode layer 33. As a result, in the electrode layer 31, electrons $e^-$ react with water molecules $H_2O$ and carbon dioxide molecules $CO_2$ to produce hydrogen molecules $H_2$, and carbon monoxide CO, and oxygen ions $O^{2-}$. The oxygen ions $O^{2-}$ move to the counter electrode layer 33 through the electrolyte layer 32. In the counter electrode layer 33, the oxygen ions $O^{2-}$ release electrons and oxygen molecules $O_2$ are produced. Through the reactions above, water molecules $H_2O$ are electrolyzed into hydrogen molecules $H_2$ and oxygen molecules $O_2$, and in the case where gas containing carbon dioxide molecules $CO_2$ flows, carbon dioxide molecules $CO_2$ are electrolyzed into carbon monoxide molecules CO and oxygen $O_2$.

In the case where gas containing water vapor and carbon dioxide molecules $CO_2$ flows, a fuel converter 25 (FIG. 25) that synthesizes various compounds such as hydrocarbons from hydrogen, carbon monoxide, and the like generated through the above-mentioned electrolysis in the electrochemical elements A and the electrochemical module M can be provided. With the fuel supply unit (not shown), hydrocarbon and the like produced by this fuel converter 25 can be extracted from the system and the device and separately used as fuel. It is also possible to convert hydrogen and carbon monoxide in the fuel converter 25 to be used as a chemical raw material.

Figure 25:
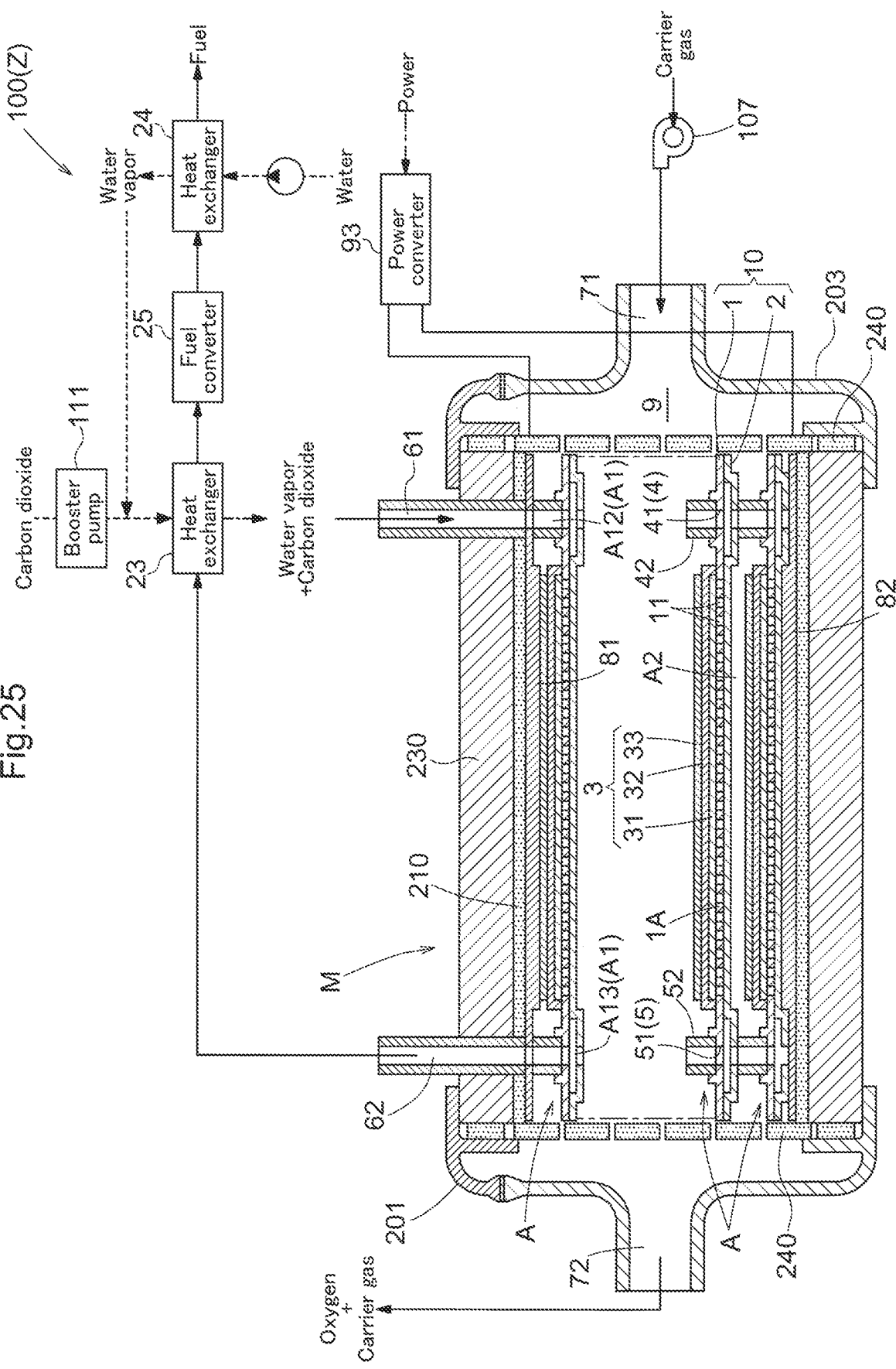
FIG. 25 is a schematic view of another energy system.

FIG. 25 shows examples of the energy system Z and the electrochemical device 100 in the case where the electrochemical reaction portions 3 are operated as electrolysis cells. In this system, supplied water and carbon dioxide are electrolyzed in the electrochemical reaction portion 3 to produce hydrogen, carbon monoxide, and the like. Furthermore, in the fuel converter 25, hydrocarbons and the like are synthesized. By employing the configuration in which a heat exchanger 24 shown in FIG. 25 is operated as a waste heat utilization system that performs heat exchange between the water and the reaction heat produced by the reaction in the fuel converter 25 to vaporize the water, and a heat exchanger 23 shown in FIG. 25 is operated as a waste heat utilization system that performs heat exchange between water vapor and carbon dioxide, and waste heat produced by the electrochemical elements A to preheat the water vapor and the carbon dioxide, the energy efficiency can be improved.

Moreover, a power converter 93 supplies power to the electrochemical elements A. Accordingly, as mentioned above, the electrochemical elements A function as electrolysis cells.

Therefore, with the above-mentioned configuration, an electrochemical device 100, an energy system Z, and the like that can improve the efficiency of converting electric energy into chemical energy such as fuel can be provided.

(4) In the above-described embodiment, a composite material such as NiO-GDC, Ni-GDC, NiO—YSZ, Ni—YSZ, CuO—$CeO_2$, or Cu—$CeO_2$ is used as the material of the electrode layer 31, and a complex oxide such as LSCF or LSM is used as the material of the counter electrode layer 33. With this configuration, the electrode layer 31 serves as a fuel electrode (anode) when hydrogen gas is supplied thereto, and the counter electrode layer 33 serves as an air electrode (cathode) when air is supplied thereto, thus making it possible to use the electrochemical element A as a cell for a solid oxide fuel cell. It is also possible to change this configuration and thus configure an electrochemical element A such that the electrode layer 31 can be used as an air electrode and the counter electrode layer 33 can be used as a fuel electrode. That is, a complex oxide such as LSCF or LSM is used as the material of the electrode layer 31, and a composite material such as NiO-GDC, Ni-GDC, NiO—YSZ, Ni—YSZ, CuO—$CeO_2$, or Cu—$CeO_2$ is used as the material of the counter electrode layer 33. With this configuration, the electrode layer 31 serves as an air electrode when air is supplied thereto, and the counter electrode layer 33 serves as a fuel electrode when hydrogen gas is supplied thereto, thus making it possible to use the electrochemical element A as a cell for a solid oxide fuel cell.

(5) In the above-described embodiment, the electrode layer 31 is arranged between the first plate-like body 1 and the electrolyte layer 32, and the counter electrode layer 33 is arranged on the side of the electrolyte layer 32 opposite to the first plate-like body 1. A configuration is also possible in which the electrode layer 31 and the counter electrode layer 33 are provided in an inversed arrangement. Specifically, a configuration is also possible in which the counter electrode layer 33 is arranged between the first plate-like body 1 and the electrolyte layer 32, and the electrode layer 31 is arranged on the side of the electrolyte layer 32 opposite to the first plate-like body 1. In this case, a change also needs to be made regarding the supply of gas to the electrochemical elements A.

That is, regarding the order of the electrode layer 31 and the counter electrode layer 33, and which is employed a configuration in which the first gas is the reducing component gas and the second gas is the oxidative component gas or a configuration in which the first gas is the oxidative component gas and the second gas is the reducing component gas, various aspects can be employed as long as the electrode layer 31 and the counter electrode layer 33 are arranged such that the first gas and the second gas are supplied thereto so as to appropriately react with each other.

(6) In the above-described embodiment, the electrochemical reaction portion 3 covering the gas-permeable portion 1A is provided on the side of the first plate-like body 1 opposite to the second plate-like body 2, but the electrochemical reaction portion 3 may be provided on the second plate-like body 2 side of the first plate-like body 1. That is, the present invention can also be realized with a configuration in which the electrochemical reaction portion 3 is arranged in the internal passage A1.

(7) Although the first penetrated portion 41 and the second penetrated portion 51 are provided as a pair at the two end portions of the rectangular plate-like support in the above-mentioned embodiment, there is no limitation to the configuration in which they are provided at the two end portions. A configuration may also be employed in which two or more pairs are provided. The first penetrated portion 41 and the second penetrated portion 51 need not be provided as a pair. Accordingly, one or more first penetrated portion 41 and one or more second penetrated portion 51 can be provided.

Furthermore, the shape of the plate-like support is not limited to a rectangular shape, and various shapes such as a square shape and a circular shape can be employed.

(8) In the description above, the electrochemical module M is provided with functional layers such as the insulators 210 having insulating properties. The electrochemical module M may also be provided with separate functional layers in addition to, or instead of, the above-mentioned functional layers.

(9) In the description above, the lower cover 203 and the upper cover 201 are linked to each other through welding. However, the technique for linking the lower cover 203 and the upper cover 201 to each other is not limited to welding, and the lower cover 203 and the upper cover 201 may be linked to each other using, for example, bolts or the like.

(10) In the description above, the opening 201c is formed in the upper cover 201, and the opening 203c is formed in the lower cover 203. However, a configuration is also possible in which the openings 201c and 203c are not formed. However, openings through which the first gas supply portion 61 and the first gas discharge portion 62 can be in communication with the outside are formed in the upper cover 201. Since the openings 201c and 203c are not provided, in a state where the electrochemical element stack S is housed in the container 200 constituted by the upper cover 201 and the lower cover 203, the first gas flows through the electrochemical element stack S via the first gas supply portion 61 and the first gas discharge portion 62, and the second gas flows through the electrochemical element stack S via the second gas supply portion 71 and the second gas discharge portion 72.

In this case, it is possible to form a supply protruding portion that protrudes from the upper cover 201 and is in communication with the first gas supply portion 61. Similarly, it is possible to form a discharge protruding portion that protrudes from the upper cover 201 and is in communication with the first gas discharge portion 62.

(11) In the description above, the electrochemical element stack S is clamped using the container (the first clamping portion and the second clamping portion) 200. However, the container 200 does not necessarily have to be used so long as the electrochemical element stack S can be clamped. For example, the electrochemical element stack S may be clamped using end plates (the first clamping portion and the second clamping portion) or the like.

(12) There is no limitation on the shapes of the first annular sealing portion 42 and the second annular sealing portion 52 as long as a configuration is obtained in which the first penetrated portions 41 and the second penetrated portions 51 are in communication with each other and leakage of gas can be prevented. That is, it is sufficient that the first annular sealing portion 42 and the second annular sealing portion 52 have an endless shape provided with an opening portion therein that is in communication with the penetrated portions, and are configured to seal a gap between the adjacent electrochemical elements A. The first annular sealing portion 42 and the second annular sealing portion 52 have, for example, an annular shape. The annular shape may be any of an annular circle, an annular ellipse, an annular square, an annular polygon, and the like.

Figure 24:
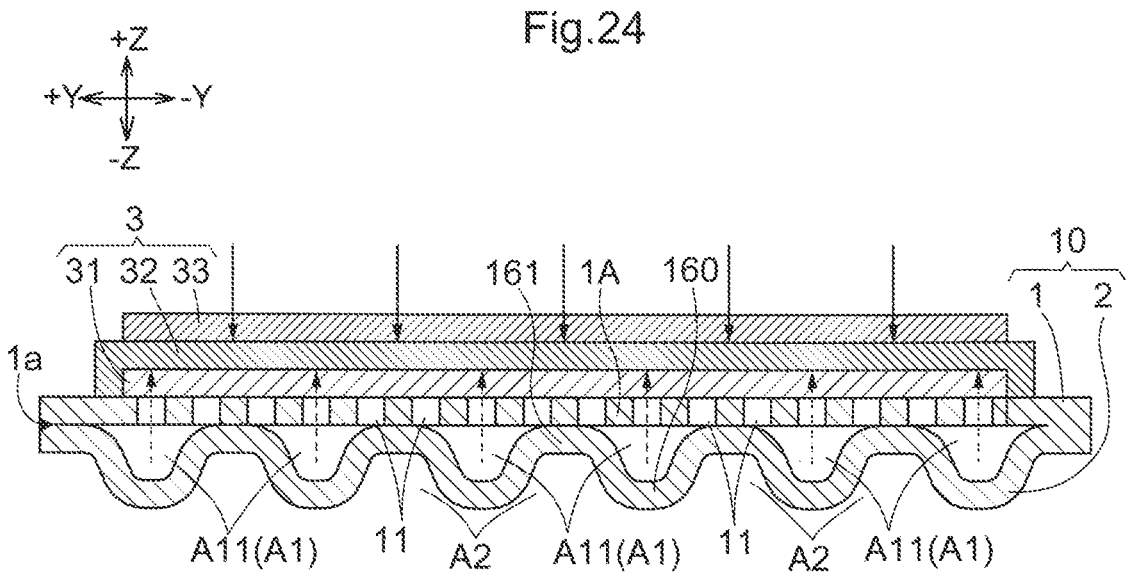
FIG. 24 is an explanatory diagram of an electrochemical module according to another embodiment.

(13) In the description above, the plate-like support 10 includes the first plate-like body 1 and the second plate-like body 2. Separate plate-like bodies may be used to form the first plate-like body 1 and the second plate-like body 2, or a single plate-like body as shown in FIG. 24 may be used to form the first plate-like body 1 and the second plate-like body 2. In the case shown in FIG. 24, the first plate-like body 1 and the second plate-like body 2 are stacked by folding a single plate-like body. The first plate-like body 1 and the second plate-like body 2 are integrated by, for example, welding the peripheral portions 1a. It should be noted that a continuous seamless plate-like body may be used to form the first plate-like body 1 and the second plate-like body 2 and may be folded to be shaped as shown in FIG. 24.

Moreover, as described later, the second plate-like body 2 may be constituted by a single member or two or more members. Similarly, the first plate-like body 1 may be constituted by a single member or two or more members.

(14) The above-mentioned second plate-like body 2 forms the internal passage A1 together with the first plate-like body 1. The internal passage A1 includes the distribution portion A12, a plurality of auxiliary passages A11, and the confluence portion A13. As shown in FIG. 5 and the like, the first gas supplied to the distribution portion A12 is distributed and supplied to the plurality of auxiliary passages A11, and merges in the confluence portion A13 after leaving the auxiliary passages A11 through the exits. Accordingly, the first gas flows in a gas-flowing direction from the distribution portion A12 toward the confluence portion A13.

The plurality of auxiliary passages A11 are formed by shaping the portion of the second plate-like body 2 other than the portions corresponding to the distribution portion A12 and the confluence portion A13 into a wavelike shape. As shown in FIG. 9 and the like, the plurality of auxiliary passages A11 form a wavelike shape in a cross-sectional view taken in a flow-intersection direction that intersects the direction in which the first gas flows. The plurality of auxiliary passages A11 are formed by extending the wavelike plate in the gas flowing direction shown in FIG. 5 and the like. The plurality of auxiliary passages A11 may be formed by a continuous wavelike plate-like body or two or more wavelike plate-like bodies between the distribution portion A12 and the confluence portion A13. For example, the plurality of auxiliary passages A11 may be formed by two or more wavelike plate-like bodies that are separate from each other in a direction extending in the gas flowing direction, or two or more wavelike plate-like bodies that are separate from each other in a direction extending in the flow-intersection direction.

As shown in FIG. 9 and the like, the plurality of auxiliary passages A11 form a wavelike shape by repeatedly forming crests and troughs with the same shape. However, the second plate-like body 2 may include a plate-like portion in the region provided with the plurality of auxiliary passages A11. For example, the plurality of auxiliary passages A11 may be formed by forming plate-like portions and protruding portions alternately. The protruding portions can be used as portions in which a fluid such as the first gas flows.

(15) The portion of the above-mentioned second plate-like body 2 corresponding to the plurality of auxiliary passages A11 need not be formed in a wavelike shape as a whole, and it is sufficient that at least a portion thereof is formed in a wavelike shape. For example, the second plate-like body 2 may be formed such that a portion in the gas flowing direction has a flat shape and the portion other than the flat portion has a wavelike shape, between the distribution portion A12 and the confluence portion A13. The second plate-like body 2 may also be formed such that a portion in the flow-intersection direction has a flat shape and the portion other than the flat portion has a wavelike shape.

(16) In the above-mentioned embodiment, the electrochemical device includes the electrochemical module M including the plurality of electrochemical elements A. However, a configuration in which a single electrochemical element is included can be applied to the electrochemical device of the above-mentioned embodiment.

DESCRIPTION OF REFERENCE SIGNS

1: First plate-like body
1A: Gas-permeable portion
2: Second plate-like body
3: Electrochemical reaction portion
4: Supply passage
5: Discharge passage
9: Distribution chamber
10: Plate-like support
31: Electrode layer
32: Electrolyte layer
33: Counter electrode layer
41: First penetrated portion
42: First annular sealing portion
51: Second penetrated portion
52: Second annular sealing portion
61: First gas supply portion
62: First gas discharge portion
71: Second gas supply portion
72: Second gas discharge portion
100: Electrochemical device
140: Supply structure
141: Supply passing portion
142: Supply preventing portion
144: Supply buffer portion
150: Discharge structure
151: Discharge passing portion
152: Discharge preventing portion
154: Discharge buffer portion
160: Auxiliary passage forming portion
161: Partitioning portion
200: Container
201: Upper cover
203: Lower cover
210: Insulator
230: Plate
A: Electrochemical element
A1: Internal passage
A11: Auxiliary passage
A12: Distribution portion
A13: Confluence portion
A2: Flowing portion
M: Electrochemical module
S: Electrochemical element stack
Z: Energy system

The invention claimed is:

1. An electrochemical element comprising:
a conductive plate-like support provided with an internal passage therein, the internal passage being configured such that a first gas that is one of reducing component gas and an oxidative component gas flows through the internal passage,
wherein the plate-like support comprises:
a gas-permeable portion through which gas is permeable between the internal passage, which is located inside the plate-like support, and the outside; and
an electrochemical reaction portion that is formed by stacking at least a film-like electrode layer, a film-like electrolyte layer, and a film-like counter electrode layer in the stated order in a predetermined stacking direction so as to entirely or partially cover the gas-permeable portion,
wherein the internal passage comprises a plurality of auxiliary passages through which the first gas flows in a predetermined flowing direction, and a distribution portion that is provided on an upstream side of the plurality of auxiliary passages in the flowing direction of the first gas,
wherein the plate-like support comprises a supply structure that is located between the distribution portion and the plurality of auxiliary passages in the flowing direction and in which the first gas is temporarily stored in the distribution portion and supply of the first gas from the distribution portion to the plurality of auxiliary passages is limited,
wherein the supply structure comprises a supply passing portion through which the first gas flows from the distribution portion to the plurality of auxiliary passages, and a supply preventing portion that prevents the first gas from flowing from the distribution portion to the plurality of auxiliary passages,
wherein the plate-like support comprises a plurality of auxiliary passage forming portions that form the plurality of auxiliary passages, and a plurality of partitioning portions that are each provided between adjacent auxiliary passage forming portions to separate adjacent auxiliary passages, and
wherein the plurality of partitioning portions are arranged such that at least one of the partitioning portions corresponds to the supply passing portion in the flowing direction.

2. The electrochemical element according to claim 1, wherein the plurality of auxiliary passages formed by the plurality of auxiliary passage forming portions are arranged such that at least one of the auxiliary passages corresponds to the supply preventing portion in the flowing direction.

3. The electrochemical element according to claim 1, wherein the location of the supply preventing portion in the stacking direction differs from locations of the distribution portion and the supply passing portion in the stacking direction.

4. The electrochemical element according to claim 3, wherein locations of the partitioning portions in the stacking direction differ from locations of the auxiliary passage forming portions in the stacking direction.

5. The electrochemical element according to claim 1, wherein the internal passage comprises a confluence portion that is provided on a downstream side of the plurality of auxiliary passages in the flowing direction of the first gas, and
wherein the plate-like support comprises a discharge structure that is located between the plurality of auxiliary passages and the confluence portion in the flowing direction and with which discharge of the first gas from the plurality of auxiliary passages to the confluence portion is limited.

6. The electrochemical element according to claim 5, wherein the discharge structure comprises a discharge passing portion through which the first gas flows from the plurality of auxiliary passages to the confluence portion, and a discharge preventing portion that prevents the first gas from flowing from the plurality of auxiliary passages to the confluence portion.

7. The electrochemical element according to claim 6, wherein the plurality of auxiliary passages formed by the plurality of auxiliary passage forming portions are arranged such that at least one of the auxiliary passages corresponds to the discharge preventing portion in the flowing direction.

8. The electrochemical element according to claim 7, wherein the plurality of partitioning portions are arranged such that at least one of the partitioning portions corresponds to the discharge passing portion in the flowing direction.

9. An electrochemical module comprising:
a plurality of the electrochemical elements according to claim 1, the electrochemical elements being stacked in the predetermined stacking direction with annular sealing portions for passing the first gas interposed between the electrochemical elements.

10. The electrochemical module according to claim 9, wherein the first gas is introduced into the internal passage via the annular sealing portions, and
wherein a flowing portion through which a second gas flows is formed between electrochemical elements that are adjacent to each other in the stacking direction, the second gas being the other of the reducing component gas and the oxidative component gas.

11. The electrochemical module according to claim 9, wherein a first electrochemical element and a second electrochemical element of the plurality of electrochemical elements are adjacently stacked,
wherein the first gas is introduced into the internal passage of the plate-like support via the annular sealing portions, and
wherein the plate-like support included in the first electrochemical element and the plate-like support included in the second electrochemical element are opposed to each other, an outer face of the plate-like support included in the first electrochemical element on which the electrochemical reaction portion is arranged is electrically connected to an outer face of the plate-like support included in the second electrochemical element that is different from an outer face on which the electrochemical reaction portion is arranged, and a flowing portion through which a second gas flows is formed between the two adjacent outer faces along the two outer faces, the second gas being the other of the reducing component gas and the oxidative component gas.

12. The electrochemical module according to claim 11, wherein the plate-like support of each electrochemical element comprises a first penetrated portion that forms a supply passage through which the first gas flows, and
wherein the first penetrated portion of each electrochemical element is in communication with an annular hole of an annular sealing portion that is interposed between adjacent electrochemical elements.

13. The electrochemical module according to claim 12, further comprising,
a first annular sealing portion in the flowing portion serving as the annular sealing portion for separating the first penetrated portion formed in each of the two outer faces from the flowing portion, and
wherein the supply passage for supplying the first gas to the internal passage is formed by the first penetrated portion and the first annular sealing portion.

14. The electrochemical module according to claim 12, wherein the plate-like support comprises a second penetrated portion that forms a discharge passage through which the first gas that has passed through the internal passage flows to the outside of the plate-like support in a surface penetration direction,
wherein the electrochemical module further comprises, in the flowing portion, a second annular sealing portion serving as the annular sealing portion for separating the second penetrated portion formed in each of the two outer faces from the flowing portion, and
wherein the discharge passage through which the first gas that has passed through the internal passage flows is formed by the second penetrated portion and the second annular sealing portion.

15. An electrochemical device comprising:
the electrochemical element according to claim 1; and
a fuel converter that supplies gas containing a reducing component to the electrochemical element, or a fuel converter that converts gas containing a reducing component generated in the electrochemical element.

16. An electrochemical device comprising:
the electrochemical element according to claim 1; and
a power converter that extracts power from the electrochemical element or supplies power to the electrochemical element.

17. An energy system comprising:
the electrochemical element according to claim 1; and
a waste heat utilization system that reuses heat discharged from the electrochemical element or a fuel converter.

18. An electrochemical device comprising:
the electrochemical module according to claim 9; and
a fuel converter that supplies gas containing a reducing component to the electrochemical module, or a fuel converter that converts gas containing a reducing component generated in the electrochemical module.

19. An electrochemical device comprising:
the electrochemical module according to claim 9; and
a power converter that extracts power from the electrochemical module or supplies power to the electrochemical element.

20. An energy system comprising:
the electrochemical module according to claim 1; and
a waste heat utilization system that reuses heat discharged from the electrochemical module or a fuel converter.

21. The electrochemical element according to claim 1, wherein no portion of the supply passing portion corresponds to any portion of any of the plurality of auxiliary passage forming portions.

* * * * *

UNITED STATES PATENT AND TRADEMARK OFFICE
CERTIFICATE OF CORRECTION

PATENT NO. : 12,230,847 B2
APPLICATION NO. : 17/599346
DATED : February 18, 2025
INVENTOR(S) : Hisao Ohnishi et al.

Page 1 of 1

It is certified that error appears in the above-identified patent and that said Letters Patent is hereby corrected as shown below:

In the Claims

Column 50, Line 52, Claim 20, delete "module" and insert -- element --

Signed and Sealed this
Fifteenth Day of April, 2025

Coke Morgan Stewart
*Acting Director of the United States Patent and Trademark Office*